United States Patent
Ezrielev et al.

(10) Patent No.: US 12,316,684 B2
(45) Date of Patent: May 27, 2025

(54) SYSTEM AND METHOD FOR MANAGING COMMUNICATION PATHS RESPONSIVE TO COMPROMISE EVENTS

(71) Applicant: Dell Products L.P., Round Rock, TX (US)

(72) Inventors: Ofir Ezrielev, Be'er Sheva (IL); Yehiel Zohar, Sderot (IL); Lee Serfaty, Be'er Sheva (IL)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 18/308,233

(22) Filed: Apr. 27, 2023

(65) Prior Publication Data

US 2024/0364751 A1 Oct. 31, 2024

(51) Int. Cl.
*H04L 9/40* (2022.01)
(52) U.S. Cl.
CPC ........ *H04L 63/205* (2013.01); *H04L 63/0823* (2013.01); *H04L 63/1433* (2013.01)
(58) Field of Classification Search
CPC ... H04L 63/205; H04L 63/1433; H04L 45/02; H04L 45/036; H04L 45/037; H04L 45/0377; H04L 45/04; H04L 45/06; H04L 45/22; H04L 45/247; H04L 41/0631; H04L 41/065; H04L 41/0659; H04L 41/0668; H04L 41/0677; H04L 41/0681; H04L 41/08; H04L 41/0895; H04L 41/0816
See application file for complete search history.

(56) References Cited

U.S. PATENT DOCUMENTS

| | | | |
|---|---|---|---|
| 7,298,704 B2 * | 11/2007 | Kodialam | H04L 45/62 398/57 |
| 8,336,100 B1 | 12/2012 | Glick | |
| 9,740,859 B2 | 8/2017 | Harris | |
| 10,735,203 B2 | 8/2020 | Reddy | |
| 11,438,369 B2 | 9/2022 | Schwartau | |
| 11,886,557 B1 | 1/2024 | Thanh Tran | |

(Continued)

FOREIGN PATENT DOCUMENTS

| | | |
|---|---|---|
| CN | 112861106 A | 5/2021 |
| CN | 117082515 A | 11/2023 |

(Continued)

*Primary Examiner* — Kostas J Katsikis
(74) *Attorney, Agent, or Firm* — WOMBLE BOND DICKINSON (US) LLP

(57) ABSTRACT

Methods and systems for securing distributed systems are disclosed. The distributed systems may include data processing systems subject to compromise by malicious entities. If compromised, the data processing systems may impair the services provided by the distributed system. To secure the distributed systems, the data processing systems may implement a security framework. The security framework may utilize a hierarchy that defines authority for validating trusted entities. The hierarchy may vest authority across the distributed system, and may be based on a reputation (e.g., weighted reputation) of each of the data processing systems within the distributed system. If the reputation indicates that a data processing system is compromised, the data processing system may be ejected and a communication topology of the distributed system may be remodeled.

20 Claims, 24 Drawing Sheets

(56) References Cited

U.S. PATENT DOCUMENTS

| | | | |
|---|---|---|---|
| 11,973,878 B2 | 4/2024 | Young | |
| 2013/0347094 A1 | 12/2013 | Bettini | |
| 2016/0350531 A1 | 12/2016 | Harris | |
| 2017/0331575 A1* | 11/2017 | Ruffini | H04L 43/10 |
| 2018/0069849 A1 | 3/2018 | Kraemer | |
| 2019/0109717 A1 | 4/2019 | Reddy et al. | |
| 2019/0312906 A1 | 10/2019 | Schwartau | |
| 2020/0107201 A1* | 4/2020 | Sinha | H04W 24/08 |
| 2020/0136838 A1 | 4/2020 | Kucharski et al. | |
| 2023/0179422 A1 | 6/2023 | Young | |
| 2023/0336581 A1* | 10/2023 | Dunn | G06F 21/577 |
| 2024/0146756 A1 | 5/2024 | Debenedetti | |
| 2024/0333730 A1* | 10/2024 | Wang | H04L 63/1416 |
| 2024/0364676 A1* | 10/2024 | Ezrielev | H04L 63/0218 |
| 2024/0364698 A1* | 10/2024 | Ezrielev | H04L 63/0823 |
| 2024/0364752 A1* | 10/2024 | Ezrielev | H04L 63/205 |

FOREIGN PATENT DOCUMENTS

| | | |
|---|---|---|
| CN | 117354023 A | 1/2024 |
| JP | 2004179724 A | 6/2004 |

\* cited by examiner

SYSTEM AND METHOD FOR MANAGING COMMUNICATION PATHS RESPONSIVE TO COMPROMISE EVENTS

FIELD

Embodiments disclosed herein relate generally to security. More particularly, embodiments disclosed herein relate to systems and methods to secure distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
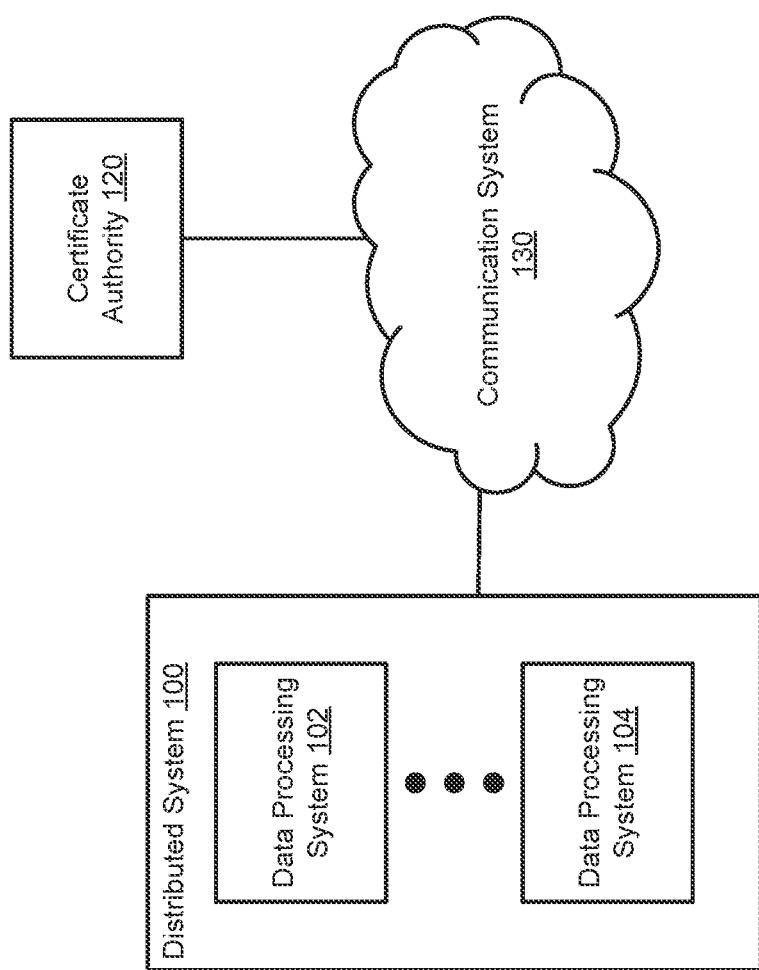
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distributed system. The distributed systems may include data processing systems that may provide any number and type of computer implemented services. Malicious entities may attempt to compromise the data processing systems. While described below with respect to malicious entities, it will be appreciated that the operation of data processing systems may be compromised due to other reasons (e.g., errors in operation) without departing from embodiments disclosed herein.

To manage risks of compromise, the data processing systems of the distributed system may implement a security framework. The security framework may distribute authority for validating entities to a variety of different data processing systems. The security framework may utilize a hierarchy of the data processing systems to define which data processing system has authority with respect to other data processing systems. Data processing systems higher in the hierarchy may have authority over data processing systems that are lower in the hierarchy.

When data processing systems of the distributed system are compromised, the hierarchy may be used to identify other data processing systems that may be impacted by the compromised data processing systems. The identified data processing systems may be remediated. If the remediations are unsuccessful, the confirmed compromised data processing systems may be excluded from the hierarchy. Exclusion from the hierarchy may render the data processing systems as untrusted to the remaining data processing systems. Consequently, the confirmed compromised data processing systems may be excluded from continuing influence on the distributed system.

The hierarchy of the distributed system (also referred to herein as "distributed system hierarchy") may be established using, at least, a weighted reputation score (also referred to herein simply as a "weighted reputation") of each data processing system making up the distributed system. The weighted reputation of a data processing system may be affected by (e.g., calculated using) factors such as, but not limited to: seniority, adherence to rules, stability of traffic, etc. Data processing systems with higher (e.g., larger) weighted reputations are deemed more reliable and thus arranged higher within the hierarchy (e.g., may be used as a root data processing system (e.g., a root node) and/or may be located closer to the root node). More reliable data processing systems may also be used to sign (e.g., authenticate/certify) more of the other data processing systems within the distributed system while less reliable data processing systems may be configured to sign less amounts of other data processing systems. Such a hierarchy that prioritizes less risky data processing systems (e.g., data processing systems with higher weighted reputations that are less likely to fail an authentication by another data processing system) advantageously improves the stability of the above-discussed data processing system authentication process.

Overtime, various events may occur that impact security postures of data processing systems. Occurrences of these events may trigger revision of the hierarchy. Security data used to validate authority of data processing systems may be updated based on the revised hierarchies in a manner that allows for authority to continue to be validated while the security data is refreshed.

If the posture of a data processing system falls below a certain standard, the data processing system may be treated as being compromised. When compromised data processing systems are identified, they may be excluded from the hierarchy and a local security data refresh may be performed to limit influence of the compromised data processing system on operation of the distributed system (e.g., after being excluded).

To ascertain whether the posture of a data processing systems falls below the standards, information regarding the operation of a data processing may be collected from multiple sources to establish a more complete view of the operation of the data processing system. Additionally, a combination of both passive and active monitoring of the operation of the data processing system may be employed.

When a data processing system is identified as being compromised, an analysis of the distributed system may be conducted to identify whether a remodeling of the distributed system should be performed. During remodeling, the communication topology of the distributed may be modified to ensure that data processing systems are not required to expose traffic to compromised data processing systems.

Thus, embodiments disclosed herein may address, among others, the technical problem of resource cost for security in distributed systems. By implementing the framework, the resource cost for securing the distributed systems may be reduced. By distributing authority for validation of trusted entities across the distributed system, the impact of compromises on the system may be limited. Thus, the resource cost for subsequent remediations of the distributed system may also be reduced. Accordingly, a system in accordance with embodiments disclosed herein may more efficiently marshal limited computing resources of system through reduce resource expenditures for securing the distributed system.

In an embodiment, a method for managing security of a distributed system comprising data processing systems is provided. The method may include identifying an ejection of a data processing system of the data processing systems from the distributed system, the data processing system being ejected due to a likelihood of the data processing system being compromised; based on the ejection, performing a communication topology analysis of the distributed system to identify any critical links of the distributed system; making a determination regarding whether any of the critical links are served by the data processing system; in a first instance of the determination where at least one of the critical link is served by the data processing system: remodeling the distributed system to eliminate the at least one of the critical links served by the data processing system; and deprioritizing redundant links of the distributed system served by the data processing system.

Remodeling the distributed system may include establishing a new link that renders the critical link to be a redundant link.

Establishing the new link may include moving a second data processing system that uses the critical link to a new location where the second data processing system can communicate with a third data processing system; and using communication between the second data processing system and the third data processing system to setup the new link.

The critical links may be links (e.g., communication links) for which no redundant links are available, and the new link being a redundant link for the critical link.

Deprioritizing the redundant links of the distributed system served by the data processing system may include updating traffic shaping policies of a portion of data processing systems that use the critical links to preferentially direct traffic over the redundant link rather than the critical link.

Deprioritizing the redundant links of the distributed system served by the data processing system may include disabling ports of the data processing system associated with the critical link.

The likelihood of the data processing system being compromised may be based on reports regarding activity of the data processing system from at least two of the data processing systems.

The reports may be used to revise a reputation of the data processing system, and the data processing system likely to be compromised when the reputation falls below a threshold.

In an embodiment, a non-transitory media is provided. The non-transitory media may include instructions that when executed by a processor cause the method to be performed.

In an embodiment, a data processing system is provided. The data processing system may include the non-transitory media and a processor, and may initiate performance of the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, data acquisition services, and/or any other type of service that may be implemented with a computing device.

To provide the computer implemented services, the system of FIG. 1 may include distributed system 100. Distributed system 100 may include any number of data processing systems 102-104 that provide the computer implemented services. The data processing systems may cooperatively provide the computer implemented services.

The data processing systems of distributed system 100 may be geographically distributed and communicate with one another via wired and/or wireless networks. The geographic distribution and communications may present risks to the computer implemented services. For example, malicious entities (not shown) may attempt to interfere with the operation of any of the data processing systems. To do so, the malicious entities may communicate with the data processing systems. The communications may request, for example, that various operations be performed, that various information be provided, and/or may otherwise ask data processing systems 102-104 to perform one or more operations that may compromise the provided the computer implemented services.

To manage such risks, the data processing systems of distributed system 100 may implement a security framework. The security framework may require that the data processing systems validate that they are communicating with and/or otherwise interacting with trusted entities.

To enable the data processing systems to perform validations as part of the security framework, the data processing systems may obtain information from certificate authority 120. Certificate authority perform validation processes for trusted entities and distribute security data (e.g., certificates, which may be signed by the certificate authority and verifiable using a publicly available key for the certificate authority) to data processing systems usable to validate trusted entities. When a data processing system interacts with another entity, the data processing system may attempt to validate the entity using the security data. If validated, the data processing system may continue to interact with the entity. Otherwise, the data processing system may discontinue interaction with the entity.

However, this approach to validating entities relies on a single certificate authority. If the certificate authority is unavailable (e.g., to manage security data and update it over time as new information regarding entities becomes available) temporarily or never available, then the security data distributed by certificate authority 120 may not be reliable for validation purposes.

For example, after an entity that was previously validated by certificate authority 120 becomes compromised, if the previously distributed security data is not timely updated (e.g., revoked and/or replaced) by certificate authority 120 then the compromised entity may be believe a trusted entity by the data processing systems of distributed system 100. Further, if certificate authority 120 itself becomes compromised, then all of data processing systems 102-104 may be subject to compromise. For example, the certificate authority may (i) distribute security data that indicates that malicious entities are to be trusted, and/or (ii) may use its authority over data processing systems 102-104 to induce performance of actions that may directly compromise the computer implemented services provided by distributed system 100.

In general, embodiments disclosed herein may provide methods, systems, and/or devices for managing security of distributed systems. The disclosed systems may manage security using security framework that distributes authority throughout the distributed system. By distributing the authority throughout the distributed system, the impact of compromise of portions of the distributed may be limited (e.g., rather than expansive in the case of a compromised certificate authority).

The authority may be distributed throughout the system based on a likelihood of members of the distributed system being compromised. Members less likely to be compromised may be given higher levels of authority (e.g., may occupy higher levels in a hierarchy that defines the distribution of authority). The levels of authority may be verified over time to make adjustment to the distribution of the authority.

In the event that a member of the distributed system becomes compromised (e.g., based on a sufficiently low reputation), the member may be ejected from the distributed system. During the ejection process, security data from portions of the distributed system which may also be compromised may be updated to reduce the likelihood of the compromise of the compromised member impacting security of the updated distributed system.

To ascertain whether a member is compromised, information regarding the member may be obtain from other members of the distributed system and aggregated in an authoritative member for the potentially compromised member. The authoritative member may then make the determination.

When a member is ejected from the distributed system, an analysis of the distributed system may be performed to identify whether any critical links (e.g., communication links) are served by the now-ejected member. The distributed system may be remodeled to eliminate such links to ensure that the remaining members of the distributed system are not required to interact with the ejected member to continue to operate as part of the distributed system.

Thus, embodiments disclosed herein may address, among others, the technical problem of security in distributed systems. The disclosed embodiments may address security in distributed systems through distributed authority for determining whether entities within the system are trusted.

To provide the above noted functionality, data processing systems 102-104 may implement a security framework that manages authority (e.g., for determining trust) based on a hierarchy. The hierarchy may be established when the distributed system is initially setup. As part of the setup process, a spanning tree or other type of structure for the data processing systems may be established. The spanning tree may be established via any process.

For example, the spanning tree may be established based on connectivity between the data processing systems. Upon startup, the data processing systems may establish a mesh network or other communication topology between the data processing systems. The mesh network may use the spanning tree protocol or other methodology for defining which links between the data processing systems should be active.

The hierarchy of the distributed system may also be established using, at least, a weighted reputation of each data processing system making up the distributed system. The weighted reputation of a data processing system may be affected by (e.g., calculated using) factors such as, but not limited to: seniority, adherence to rules, stability of traffic, etc. Data processing systems with higher (e.g., larger) weighted reputations are deemed more reliable and thus arranged higher within the hierarchy (e.g., may be used as a root data processing system (e.g., a root node) and/or may be located closer to the root node). More reliable data processing systems may also be used to sign (e.g., authenticate/certify) more of the other data processing systems within the distributed system while less reliable data processing systems may be configured to sign less amounts of other data processing systems. Such a hierarchy that prioritizes less risky data processing systems (e.g., data processing systems with higher weighted reputations that are less likely to fail an authentication by another data processing system) advantageously improves the stability of the above-discussed data processing system authentication process.

The hierarchy may be established using both weighted reputation and connectivity of the data processing systems. For example, the weighted reputations may be used to modify an initial hierarchy established through use of the spanning tree protocol. Various exchanges and/or other operations may be performed. The corresponding connectivity of the data processing systems may also be modified, or may not be modified. Refer to FIGS. 2A-2C and 5 for additional details regarding setup of distributed systems and establishing hierarchy.

Figure 7:
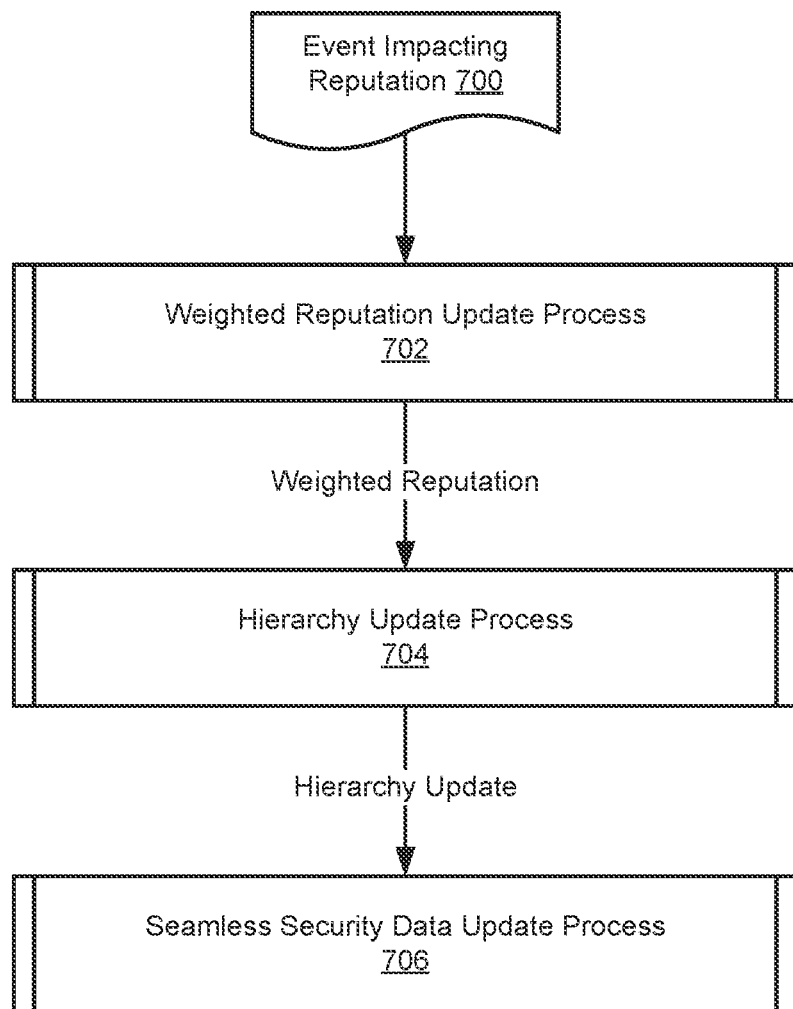
FIG. 7 shows a data flow diagram in accordance with an embodiment.

Overtime, the hierarchy may be adjusted to address changes in the security posture of the data processing system. As new information regarding the likelihood of compromise of data processing systems becomes available, the hierarchy may be updated. Refer to FIG. 7 for additional details regarding updating of hierarchies.

Figure 9:
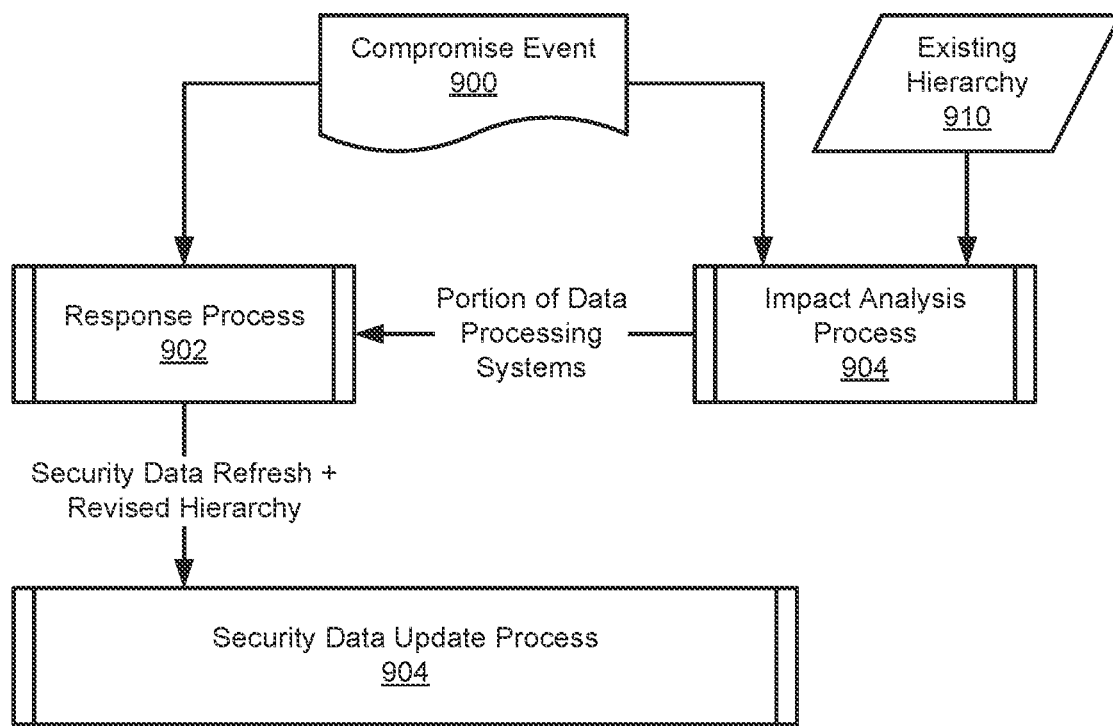
FIG. 9 shows a data flow diagram in accordance with an embodiment.

If a reputation of a data processing system is sufficiently low, the member may be ejected from the distributed system and the hierarchy may be revised to manage an impact of the compromise. Additionally, security data from a portion of the distributed system that may also have been compromised and used to validate authority may be updated to ensure that influence of the compromised data processing system does not persist. Refer to FIG. 9 for additional details regarding managing impacts of compromised data processing system.

To identify whether the member is compromised, information collected from multiple members regarding the suspect member may be collected and aggregated. The aggregated information may be used to make the determination. If the suspect member is determined to likely not be compromised, supplemental monitoring of the suspect member may be put in place if there is ongoing concern that the suspected member may actually be compromised. Refer to FIGS. 11A-11D regarding collecting information regarding the operation of suspect members.

Once established, the hierarchy may be used to obtain security data for the data processing systems. To obtain the security data, each data processing system may generate a key pair. Data processing systems more highly rated than other data processing systems may establish certificates for lower ranked data processing systems. Refer to FIG. 2D for additional details regarding security data.

As the hierarchy is modified, security data for the data processing systems may be refreshed. During refreshes of the security data, different portions may be updated in orders such that the authority of the data processing systems may still be validated. Refer to FIG. 7 for additional details regarding refreshing security data.

The certificates and key pairs may be used in the security framework to validate entities. For example, when a data processing system obtains a communication from an entity, the communication may be validated by ascertaining (e.g., using the certificates) whether a data processing system higher in the hierarchy has validated that the entities is to be trusted. The determination may be made by attempting to use public keys in certificates signed by the data processing system higher in the hierarchy to validate a signature included in the communication. If the signature is validated, then the entity may be identified as being trusted. Otherwise, the entity may be treated as not being trusted. Refer to FIGS. 2E-2F for additional details regarding validating entities.

Over time, some of the data processing systems may be compromised. For example, malicious code may be executed by a data processing system which may modify operation of the data processing system in an undesired manner.

Compromised data processing systems may be identified via any method (e.g., code checksums, challenge-response, etc.). As data processing systems become compromised, some of the security data used in the framework may be updated and/or the hierarchy may be updated (e.g., to exclude the compromised devices). To identify the security data to refresh, the hierarchy may be used to identify data processing systems likely to be impacted by the compromised data processing system. The security data for only those data processing systems may be updated.

If any data processing system cannot be remediated to return to a nominal operating state, then the hierarchy may be updated to exclude the data processing system from the hierarchy. Consequently, the authority vested in these data processing systems may be divested.

Figure 13A:
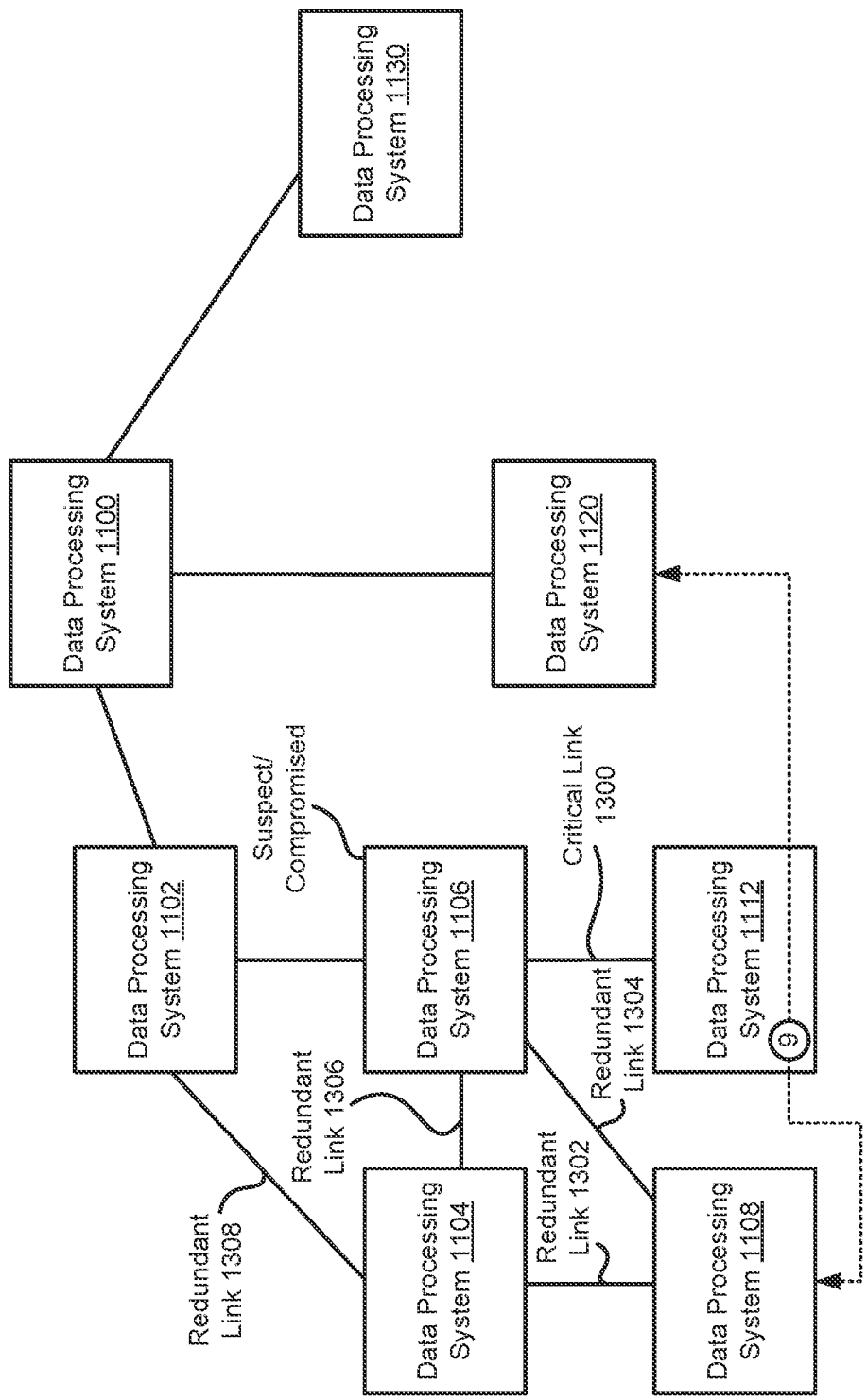
FIG. 13A-13B show data flow diagrams in accordance with an embodiment.
Figure 13B:
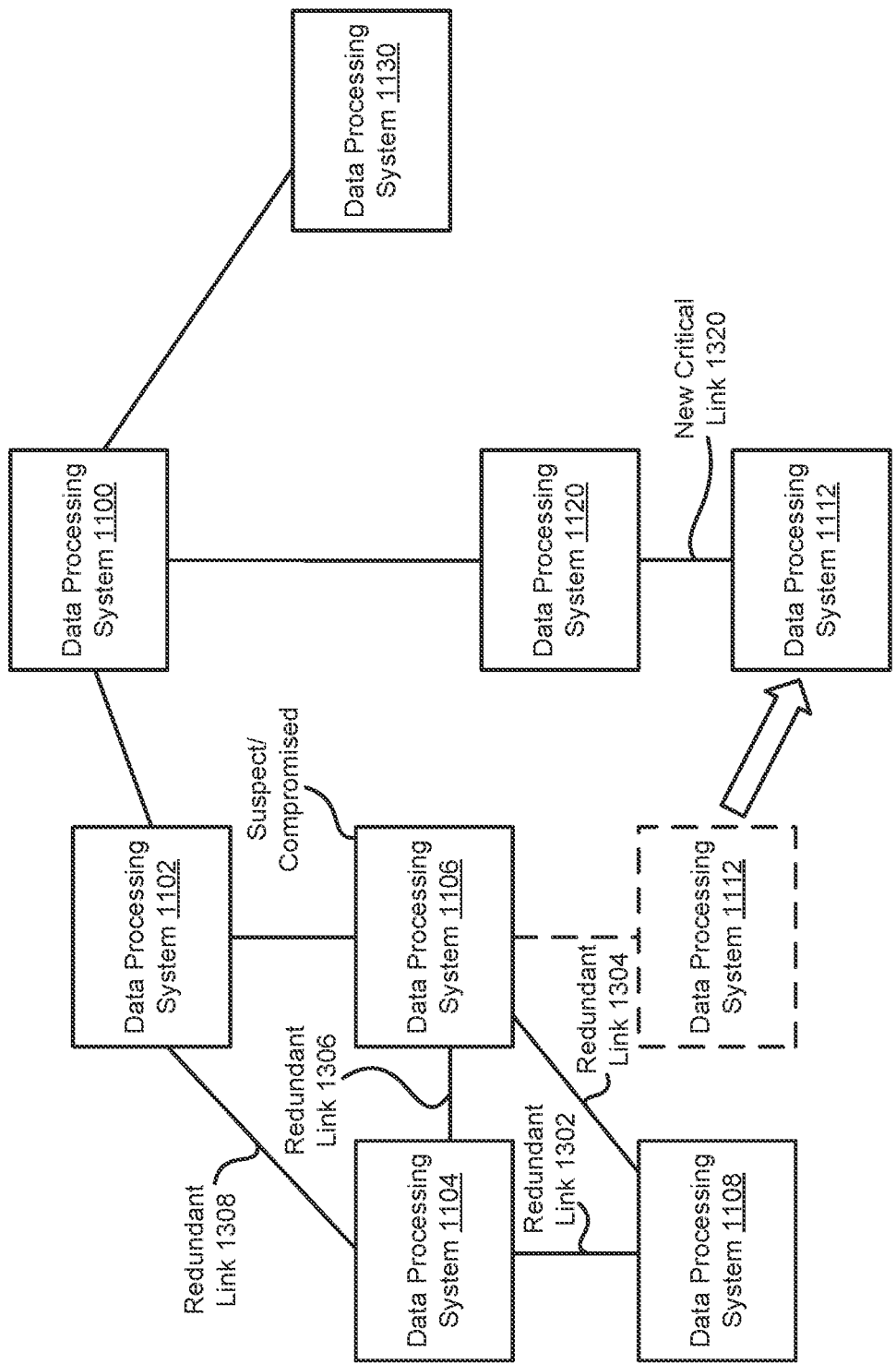

Similarly to the updated hierarchy, communication topologies of the distributed system may also be updated when compromised data processing systems are identified. The communication topologies may be updated to ensure that data processing systems are not required to use communication paths that include compromised data processing systems. Refer to FIGS. 13A-13B for additional details.

When providing their functionality, any of data processing systems 102-104 may perform all, or a portion, of the methods illustrated in FIGS. 3-4, 6, 8, 10, 12, and 14.

Any of data processing systems 102-104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 11.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of instances of distributed system 100 and/or other components not shown in FIG. 1. Any of the instances may perform similar and/or different functions performed by other instances.

Figure 2A:
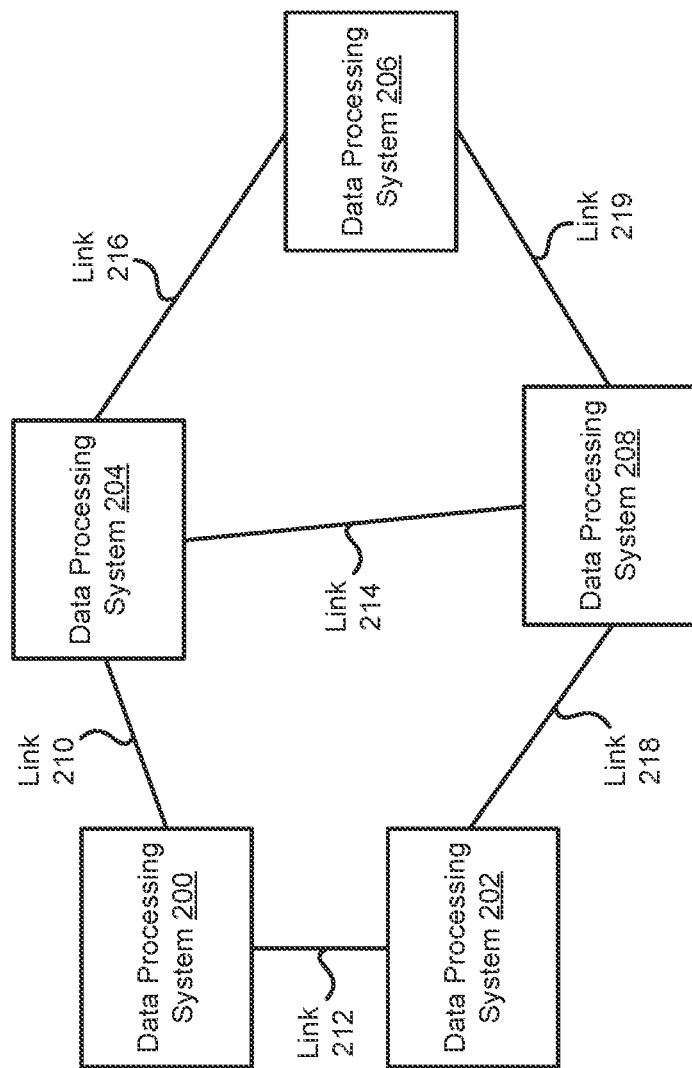
FIG. 2A shows a first diagram of a distributed system in accordance with an embodiment.

Turning to FIG. 2A, a first diagram of an example topology of a distributed system in accordance with an embodiment is shown. The distributed system may provide any type and quantity of computer implemented services.

To provide the services, the distributed system may include data processing systems 200-208. The data processing systems may be implemented using, for example, internet of things devices. The data processing systems may include wired and/or wireless communication hardware through which any number of links (e.g., communication channels) may be established. In the example distributed system shown in FIG. 2A, only a limited number of links 210-219 may be established between the data processing systems. Links 210-219 may form the basis for a mesh or other type of network.

In the state shown in FIG. 2A, the data processing systems 200-208 may have been migrated from a first environment (e.g., factory) in which trust between the data processing systems was established to a new environment in which devices of malicious parties may be present. Consequently, the data processing systems may need to establish a security framework mitigate the threats presented by the malicious parties.

Figure 2B:
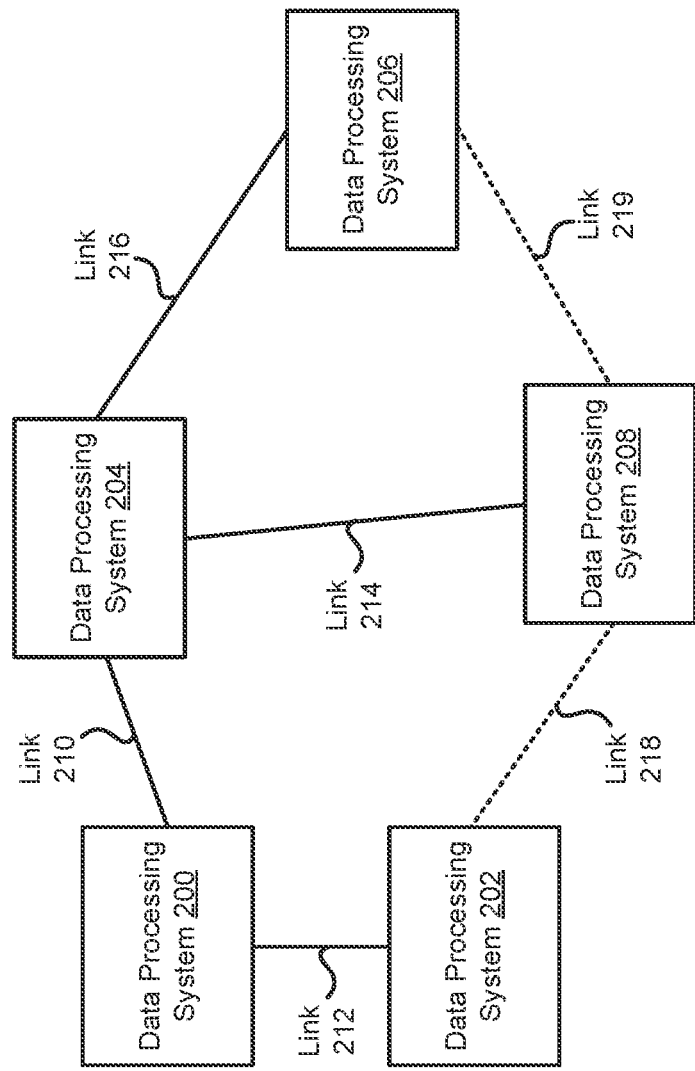
FIG. 2B shows a second diagram of a distributed system in accordance with an embodiment.

Turning to FIG. 2B, a second diagram of an example topology of a distributed system in accordance with an embodiment is shown. Continuing with the previous example discussed with respect to FIG. 2A, once deployed the data processing systems may perform the spanning tree protocol or other network analysis algorithms to establish a loop-free logical topology for communication between the data processing systems. In this example, the result of performing the spanning tree protocol may indicate that link 218 and link 219 are to be disabled (drawn in dashing to indicate being disabled). In this example, data processing system 204 may be a gateway to other networks or devices. Thus, data processing system 204 may serve as the root with the links being pruned to accomplish various goals (e.g., minimize link contention).

As discussed above, a hierarchy for the data processing systems may be established based at least in part on a spanning tree for the data processing systems. The result of the spanning tree protocol for network configuration may be a spanning tree usable for other purposes. In this example, the same spanning tree generated for network configuration may be used to establish the hierarchy, or at least an initial iteration of the hierarchy.

Figure 2C:
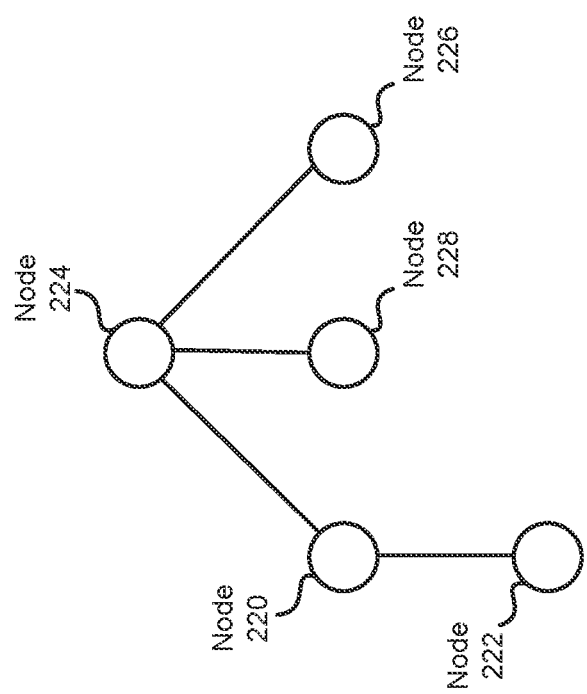
FIG. 2C shows a second diagram of a spanning tree in accordance with an embodiment.
Figure 2D:
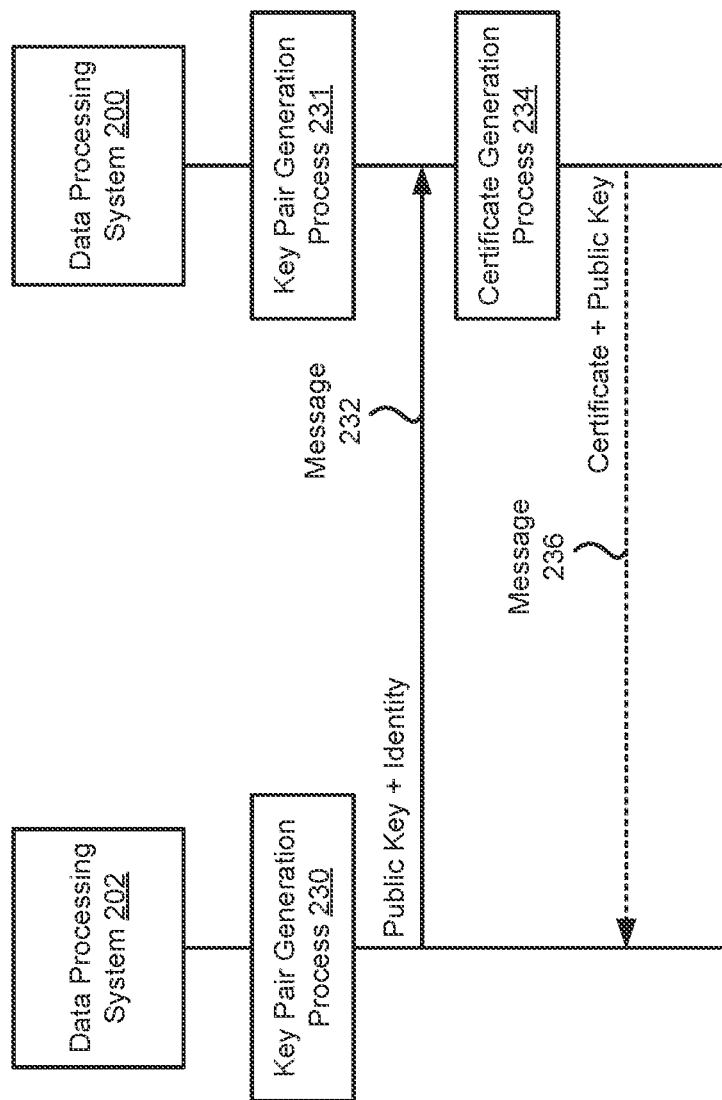
FIG. 2D shows a first data flow diagram illustrating data flows in accordance with an embodiment.
Figure 2E:
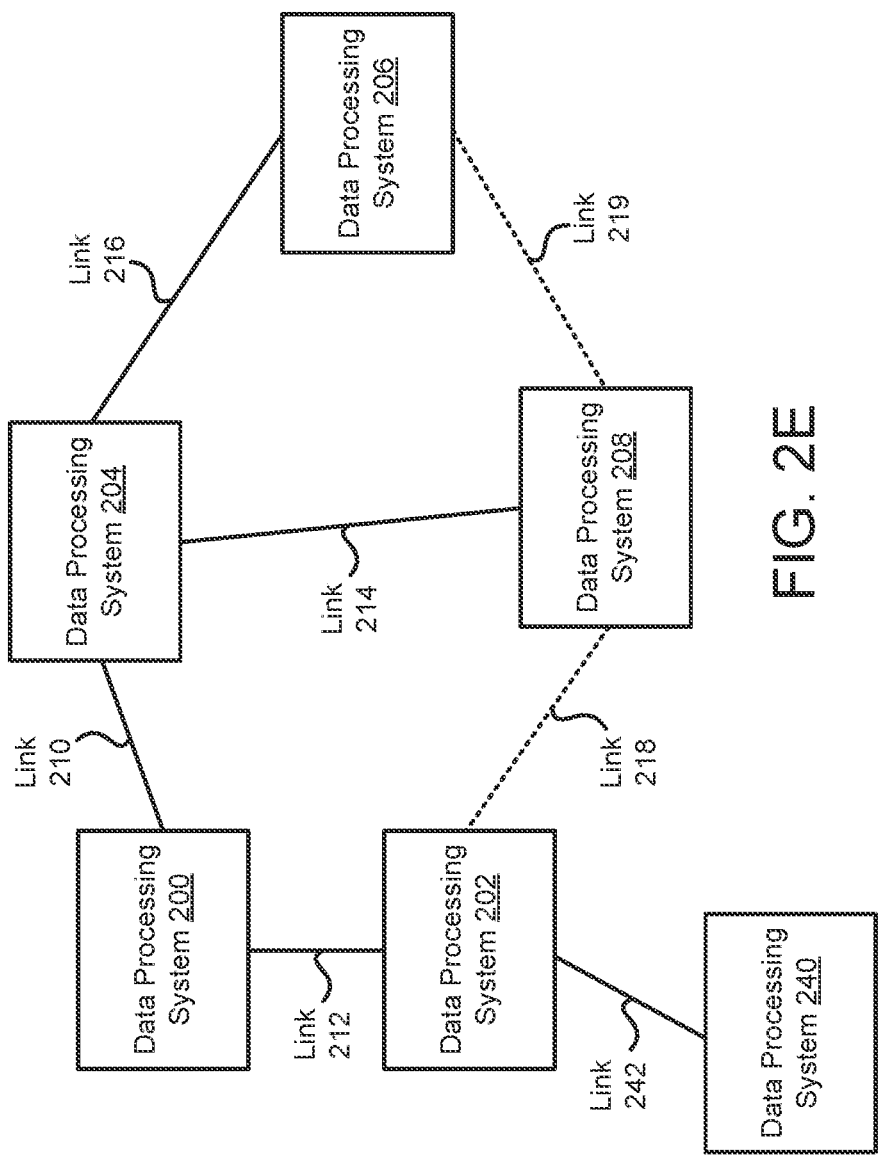
FIG. 2E shows a third diagram of a distributed system in accordance with an embodiment.
Figure 2F:
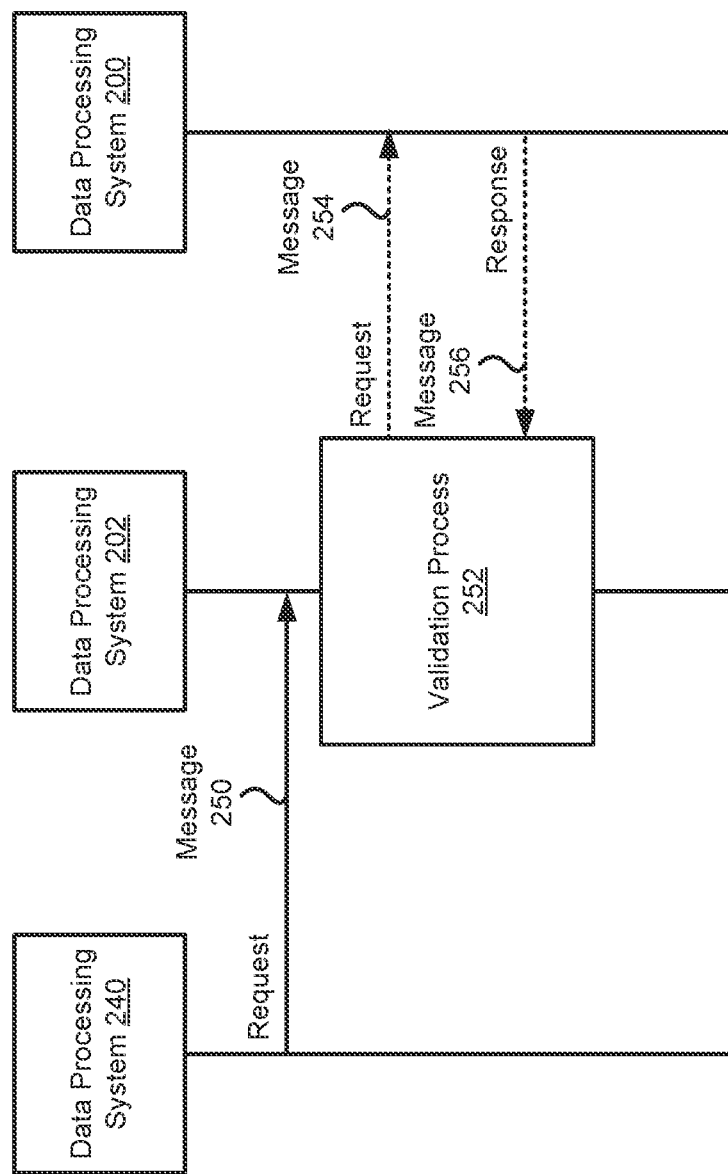
FIG. 2F shows a second data flow diagram illustrating data flows in accordance with an embodiment.

Turning to FIG. 2C, a diagram of a spanning tree in accordance with an embodiment is shown. As discussed above, the spanning tree may be established using the spanning tree protocol. However, it will be appreciated that other algorithms may be used to obtain a spanning tree (or other type of structure) for the distributed system.

The spanning tree may include nodes 220-228. The nodes may correspond to different data processing systems. Node 224 (e.g., a root node) may correspond to data processing system 204. Node 220 may correspond to data processing system 200. Node 222 may correspond to data processing system 202. Node 226 may correspond to data processing system 206. Node 228 may correspond to data processing system 208.

While used to configure the links, the spanning tree may also be used to establish authority for validating entities in the system. Rather than having a central authority for validating entities, each data processing system may have authority for validating entities below them (i.e., the data processing system corresponding to child nodes) in the hierarchy.

For example, node 220 may be responsible for validating for node 222. In other words, node 222 may treat node 220 as the entity that must attest to the validity of any entity.

To facilitate validation, each of the nodes may generate security data usable for validation purposes. Refer to FIG. 2D for additional details regarding generation of security data.

While the spanning tree illustrated in FIG. 2C may be used as a hierarchy, it will be appreciated that the hierarchy may be modified based on weighted reputations of the data processing systems corresponding to the nodes, and/or may be based entirely on weighted reputations of the data processing systems. If based on a combination of each, an initial spanning tree may be establishing using the spanning tree protocol. The weighted reputations for the data processing systems may then be established and used to, for example, modify locations of some nodes in the spanning tree, divide branches, consolidate branches, and/or perform other types of modifications. The modifications may be performed to move nodes corresponding data processing systems with larger weighted reputations towards the root and other nodes corresponding to other data processing systems with smaller weighted reputations towards the leaves (e.g., 222, 228, 226).

Turning to FIG. 2D, a first data flow diagram in accordance with an embodiment is shown. In the diagram, processes performed by entities are diagrammed as boxes positioned over the line descending from the box representing each entity. For example, the box marked as 230 in FIG. 2D may be a process performed by data processing system 202 through which data is obtained. Additionally, in the diagram, data flows between devices are shown with lines terminating in arrows between the lines descending from each of the boxes representing the entities. For example, the line terminating in an arrow and marked as 232 may indicate a data flow from data processing system 202 to data processing system 200. Further, the activities indicated by the elements below the boxes representing each entity may be temporally ordered such that activities shown higher on the page may be performed activities shown lower on the page. Other data flows diagrams discussed below may follow similar conventions.

Continuing with the discussion from FIG. 2D, security data may be generated usable to perform validations. A portion of the security data may be generated by each of the data processing systems through key pair generation processes (e.g., 230, 231). The data processing systems may include hardware capable of generating secure key pairs including private and public keys.

Once generated, each data processing system may identify their respective place in the hierarchy. Once identified, the data processing system above them (if any) in the hierarchy may be identified. In this example, data processing system 200 is above data processing system 202 in the hierarchy.

Once identified, data processing system 202 may send message 232 to data processing system 200. The message may request that data processing system 200 sign for data processing system (e.g., create an attestation usable to validate data processing system 202). Message 232 may include the public key of the key pair and an identity of data processing system 202. Data processing system 200 perform certificate generation process 234 to sign as requested. During certification generation process 234, data processing system 200 may sign the public key and identity (e.g., may be an identifier for data processing system 202) using a private key generated by data processing system 200 during key pair generation process 231 thereby generating additional security data (e.g., a certificate). The additional security data may allow any entity that views data processing system 202 as authoritative (e.g., based on the hierarchy) to validate whether a communication is from data processing system 202.

For example, data processing system 202 may sign communications using a private key of the key pair generated in key pair generation process 230. An entity that receives the communication may use the public key from the certificate to identify that the entity that generated the communication has access to the private key of the key pair. And the entity may use the public key of data processing system 200 to determine that the certificate should be trusted.

The certificate and public key of data processing system 200 may be published by sending them to data processing system 202 and/or other entities (e.g., via message 236). Once distributed, the data processing systems of the distributed system may have sufficient security data to quickly ascertain whether a communication is from a trusted source and/or whether and entity that sent the communication should be trusted. Any quantity of security data for any number of data processing systems of a distributed system may be established in this manner.

Turning to FIG. 2E, a third diagram of an example topology of a distributed system in accordance with an embodiment is shown. Continuing with the example discussed with respect to FIG. 2D, now consider an example scenario where data processing system 240 establishes link 242 with data processing system 202 and attempt to communicate with data processing system 202. Prior to acting on the communications, data processing system 202 may initiate performance of a validation for data processing system 240.

Turning to FIG. 2F, a second data flow diagram in accordance with an embodiment is shown. Continuing with the example from FIG. 2E, data processing system 240 may initiate communication with data processing system 202 by sending message 250 in which a request is made to data processing system 202. The request may indicate that a particular action is to be performed.

Prior to acting on the request, data processing system 202 may perform validation process 252. During validation process 252, data processing system 202 may evaluate the security data (e.g., signatures) included in message 250.

If no signature is included, then message 250 may be treated as being from an untrusted entity.

If a signature is included, then security data may be used to ascertain whether the entity that generated message 250 should be trusted. To do so, data processing system 202 may initiate a verification for the signature. During the verification, data processing system 202 may use security data generated by data processing system 200 to attempt to verify the signature. For example, public keys and/or identifiers from certificates signed by data processing system 200 may be used to attempt to (i) validate the signatures and (ii) verify that the signatures are associated with the identifiers. If the signatures are both valid and associated with the entity alleged in message 250 to have generated message 250, then the entity and/or message 250 may be treated as a trusted entity (e.g., the message 250 may be processed rather than discarded). If the signatures cannot be validated or are not associated with the entity alleged in message 250 to have generated message 250, then the entity and/or message 250 may be treated as not trustworthy.

To verify the signatures, data processing system 202 may use local copies of certificates, or data processing system 202 may forward the request via message 254 for data processing system 200 for analysis. If forwarded to data processing system 200, then a response may be returned to data processing system 202 via message 256.

Once the trustworthiness of the message and/or sender identified, then data processing system 202 may take appropriate action.

Figure 3:
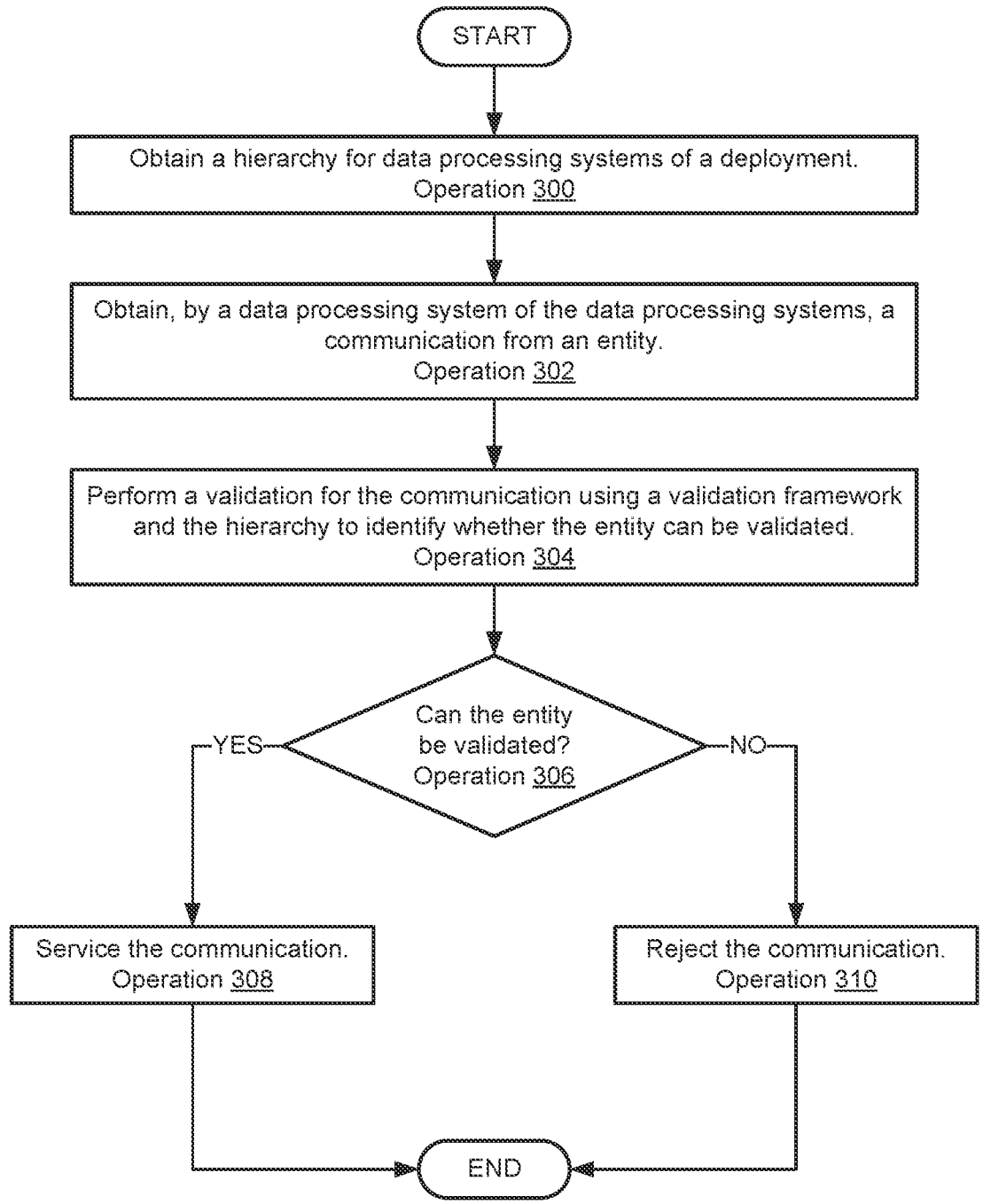
FIGS. 3-4 show flow diagrams illustrating methods in accordance with an embodiment.
Figure 4:
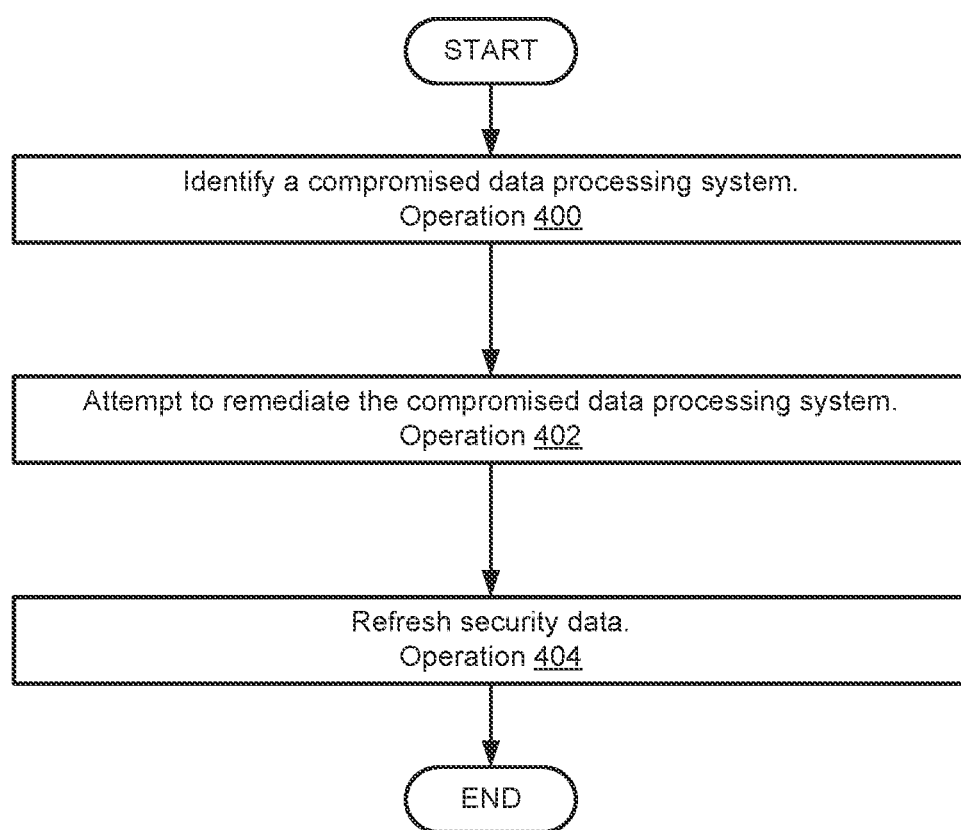

As discussed above, the components of FIG. 1 may perform various methods to manage security of distributed systems. FIGS. 3-4 illustrate methods that may be performed by the components of the system of FIG. 1. In the diagrams discussed below and shown in FIGS. 3-4, any of the operations may be repeated, performed in different orders, and/or performed in parallel with or in a partially overlapping in time manner with other operations.

Turning to FIG. 3, a flow diagram illustrating a method for performing validations in accordance with an embodiment is shown. The method may be performed by any of data processing systems 102-104 and/or other components of the system shown in FIG. 1.

At operation 300, a hierarchy for data processing systems of a distributed system is obtained. The hierarchy may be obtained by performing an analysis of the data processing systems to obtain a spanning tree. The hierarchy may be defined by the spanning tree.

The analysis performed to obtain the spanning tree may be the spanning tree protocol, or other algorithm. The data processing systems may cooperatively perform the algorithm used to obtain the spanning tree.

The hierarchy may be used to obtain security data, as described with respect to FIGS. 2D-2F.

At operation 302, a communication from an entity is obtained by one of the data processing systems. The communication may be obtained by receiving it from another device.

At operation 304, a validation for the communication is performed using a validation framework and the hierarchy to identify whether the entity can be validated. The validation may be performed by (i) using the hierarchy to identify an authoritative data processing system (e.g., higher in the hierarchy and has authority to identify valid entities) with respect to the data processing system, and (ii) using security data associated with the authoritative data processing system to determine whether the entity can be validated.

For example, signatures in the communication may attempt to be validated, as discussed with respect to FIG. 2F. If the signatures can be validated and are associated with the entity that sent the communication, then it may be determined that the entity can be validated. If the communication is not signed, the signature cannot be validated, or the signature is not associated with the entity that send the communication, then the entity may be determined to not be valid.

If the entity can be validated, then the method may proceed to operation 308. If the entity cannot be validated, then the method may proceed to operation 310.

At operation 308, the communication is serviced. The communication may be serviced by, for example, processing a request included in the message. Processing the request may cause the data processing system to perform any number and type of actions. The method may end following operation 308.

Returning to operation 306, the method may proceed to operation 310 if the entity cannot be validated.

At operation 310, the communication is rejected. The communication may be rejected by, for example, discarding the communication without processing the content. The communication may also be rejected by, for example, sending alerts or notification to other data processing systems indicating presence of a malicious entity, attempting to validate the entity again, etc.

The method may end following operation 310.

Using the method shown in FIG. 3, distributed systems may be secured. However, if data processing systems of a distributed system becomes compromised, then the data processing system and other data processing systems for which the data processing services an authoritative data processing system may be subject to compromise. For example, the compromised data processing system may validate communication that are, in face, malicious in nature.

Turning to FIG. 4, a flow diagram illustrating a method for responding to compromised data processing systems in accordance with an embodiment is shown. The method may be performed by any of data processing systems 102-104 and/or other components of the system shown in FIG. 1.

At operation 400, a compromised data processing system may be identified. The compromised data processing system may be identified by (i) analyzing operation of the compromised data processing system, (ii) obtaining an indication from another device that the compromised data processing system is compromised, and/or via other methods.

At operation 404, an attempt to remediate the compromised data processing system may be performed. The attempt may be made by performing a remediation process for the data processing system.

The remediation process may include, for example, (i) performing processes to attempt to remove malware or other entities from the compromised data processing system, and (ii) performing security scans or other types of confirmatory operations to confirm whether the compromised data processing systems is no longer compromised.

At operation 406, the security data is refreshed. The security data may be refreshed similar to how the security data was generated (e.g., generation of new key pairs, certificates, etc.).

The method may end following operation 404.

By remediating compromised data processing systems using the method shown in FIG. 4, embodiments disclosed herein may resecure distributed systems following compromises more efficiently.

However, the attempts to remediate the data processing system may not always be successful, and the extent of remediations that may need to be performed may depend on the location in which the node for the compromised data processing system resides in the hierarchy (e.g., nodes closer to the root that become compromised may result in larger portions). To reduce the likelihood of higher impact data processing systems be compromised due to their location within the hierarchy, the hierarchy may be established, at least in part, based on the likelihood of each of the data processing systems being compromised.

Figure 5:
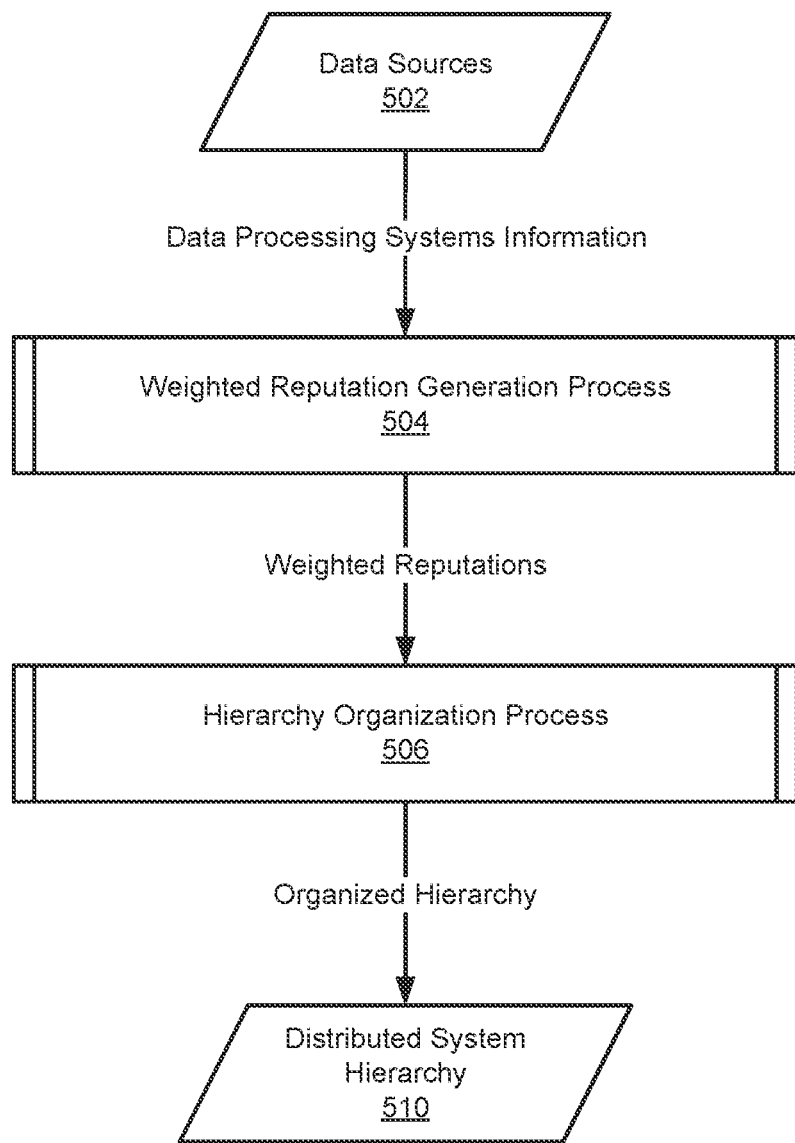
FIG. 5 shows a data flow diagram in accordance with an embodiment.

Turning to FIG. 5, a data flow diagram in accordance with an embodiment is shown. The data flow diagram illustrates a process of obtaining a hierarchy for the distributed system (e.g., a hierarchy of the data processing systems making up the distributed system). The flow in FIG. 5 may be used to establish a hierarchy that places data processing systems that are less likely to be compromised closer to the root of the hierarchy. As discussed above, the hierarchy may be based on a spanning tree for the data processing systems. The hierarchy may also be based on (e.g., in addition to being based on the spanning tree) a reliability of each data processing system in the distributed system, as discussed in more detail below.

As shown in FIG. 5, data processing systems information of the data processing systems may be gathered (e.g., retrieved from) from data sources 502. Data sources 502 may include: any of the data processing systems of the distributed system; a provider (e.g., manufacturer, vendor, distributer, etc.) of the data processing systems; any number of computing devices and/or storage devices external to the distributed system; and/or any source from which data processing systems information may be stored and/or retrieved.

The data processing systems information from the data sources 502 may include, but is not limited to, statistics and parameters (e.g., characteristics) for each of the data processing system including: operational data (e.g., from the system/data logs of each data processing system); specification data including default factory specifications; and/or any relevant data that could be used to characterize (e.g., describe) a state of each of the data processing systems.

Operational data of each of the data processing systems may include, but is not limited to: a total time of operation (e.g., run time) within the distributed system; an installation date of the data processing system within the distributed system; a total downtime of the data processing system; the number of errors/crashes experienced by the data processing system; adherence of the data processing systems to one or more rules (e.g., communication rules, connection rules, data transfer rules, etc.) set for the distributed system (also referred to herein as an "operating rule adherence rate"); traffic rate and/or traffic amount flowing through the data processing system; traffic latency; and/or any other relevant data that can be used to describe an operating state of the data processing system.

Weighted reputation generation process 504 may obtain (e.g., receive, retrieve, collect, etc.) the data processing systems information from the data sources 502 to generate (e.g., calculate) a weighted reputation score (also referred to herein simply as a "weighted reputation") for each of the data processing systems in the distributed system. The weighted reputation score may be calculated using any formulas, algorithms, and/or models that are able to covert the data processing systems information into a weighted score (e.g., weighted value). The weighted reputation score may indicate a reliability of each data processing system within the distributed system where a higher weighted reputation score represents higher reliability while a lower weighted reputation score represents lower reliability. For example, a first data processing system that is more senior (e.g., been operating longer), adheres better to rules, has zero down time within the distributed system, and has stable traffic will have a higher weighted reputation score (e.g., be more reliable) than a second data processing system that is younger (e.g., recently installed) and has more downtime (e.g., experienced more errors and crashes) within the distributed system. Similarly, a data processing system that hosts an agent that screens for malicious activity may be less likely to be compromised by a malicious entity than another data processing system that does not screen for malicious activity.

Hierarchy organization process 506 may obtain the weighted reputations (e.g., the weighted reputation scores generated by weighted reputation generation process 504) and generate a hierarchy for the distributed system (e.g., distributed system hierarchy 510 generated by the organized hierarchy produced by the hierarchy organization process 506). Data processing systems with higher weighted reputations may be: (i) placed higher on the hierarchy than data processing systems with lower weighted reputations; and/or (2) configured to be given responsibility to sign (e.g., authenticate/certify) more of the other data processing systems (e.g., data processing systems with a lower weighted reputation than the weighted reputation of the signing data processing system) within the distributed system. A data processing system with the highest weighted reputation may be selected as a root node for the distributed system. Alternatively, the root node may be selected irrespective of (e.g., without taking into consideration of/independent of) the weighed reputations while the hierarchy of the remaining data processing systems to be connected to the root node may be selected based on (e.g., dependent of) the weighted reputations.

In some embodiments, the hierarchy for the distributed system may first be established based on the spanning tree before the weighted reputations are taken into consideration by the hierarchy organization process, or vice versa. In some embodiments, the weighted reputations may be continuously updated throughout the operation lifetime of the distributed system. Each time the weighted reputations are updated, the hierarchy may also be updated (e.g., by hierarchy organization process 506) to reflect (e.g., take into account/consider) the updated weighed reputations.

For example, referring back to FIG. 2C showing a diagram of an example spanning tree. Here, node 224 (e.g., the root node) would have a highest weighted reputation score among all of the existing nodes (e.g., nodes 220, 222, 224, 226, and 228) shown in this spanning tree. As a result, node 224 is more trusted and given the responsibility of signing (e.g., authenticating/certifying) more nodes than the other nodes. Furthermore, each of nodes 220, 228, and 226 that are directly connected to the root node 224 would have a higher weighted reputation than node 222 (and a lower weighted reputation than node 224). Lastly, node 220 which signed node 222 would have a higher weighted reputation than nodes 228 and 226, both of which have no further connected neighboring nodes. In this same example, the root node 224 need not have the highest weighted reputation.

As yet another example and still referring to the spanning tree of FIG. 2C, assume, for example, that node 222 has a higher weighted reputation than node 220. As a result, instead of node 220 being connected to node 224 (e.g., the root node) and authenticating/certifying node 222 (also referred to as an authoritative node), node 222 would now be directly connected to node 224 while node 220 would be connected to (and authenticated/certified by) node 222.

Figure 6:
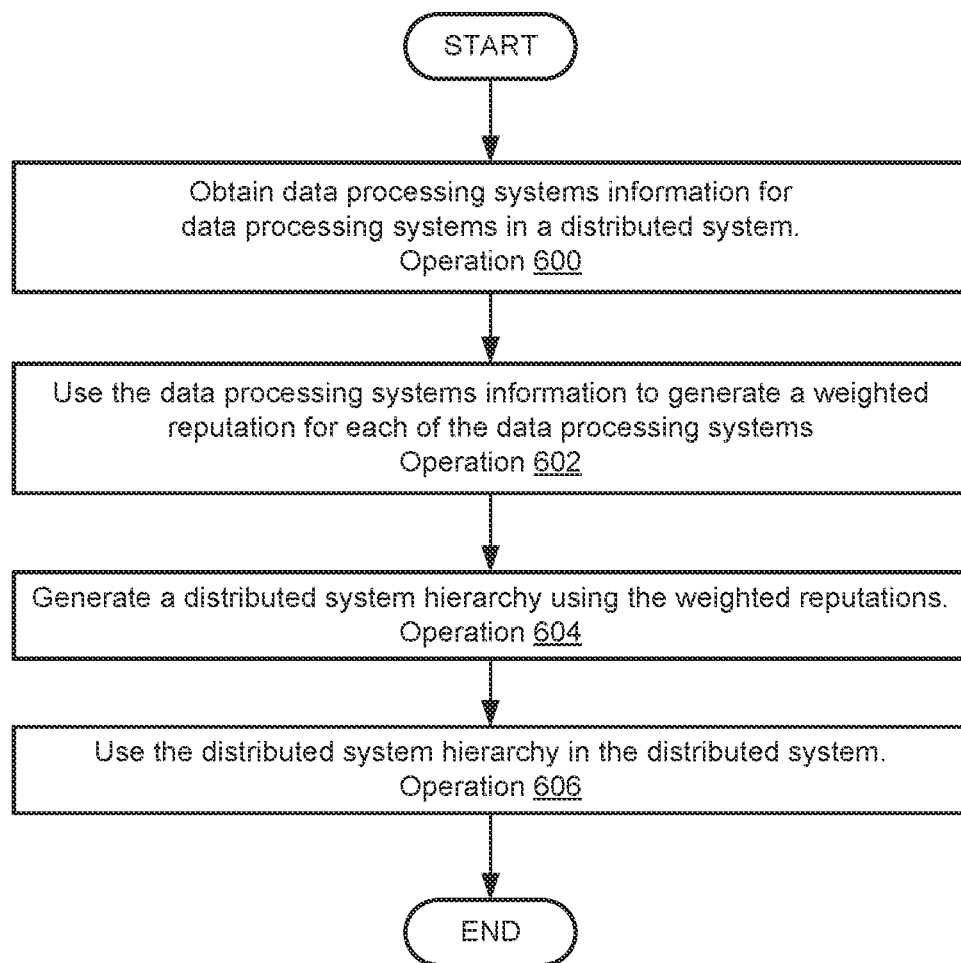
FIG. 6 shows a flow diagram illustrating a method in accordance with an embodiment.

Turning now to FIG. 6, FIG. 6 shows a flow diagram illustrating a method of managing operation of a data processing system in accordance with an embodiment. The method may be performed by the system of FIG. 1. Any of the operations described with respect to FIG. 6 may be performed in different orders, skipped, repeated, and/or be performed in a parallel or partially overlapping in time manner.

At operation 600, data processing systems information may be obtained for each of the data processing systems configured within a distributed system. The data processing systems information may be obtained from one or more data sources (e.g., data source 500 as described above in connection with FIG. 5). The data processing systems information may be obtained by: being received via a transmission from any of the data sources, directly retrieved from the data sources, etc.

At operation 602, as discussed above in reference to FIG. 5, the data processing system information may be used to generate (e.g., using weighted reputation generation process 504) a weighted reputation score for each of the data processing systems in the distributed systems.

At operation 604, as discussed above in reference to FIG. 5, the weighted reputations (e.g., ones generated in operation 602) may be used to generate (e.g., using hierarchy organization process 506 of FIG. 5) a hierarchy (also referred to as a "distributed system hierarchy") for the data processing systems of the distributed system. In some embodiments, the hierarchy for the distributed system may first be established based on the spanning tree before the weighted reputations are taken into consideration by the hierarchy organization process, or vice versa. In some embodiments, the weighted reputations may be continuously updated throughout the operation lifetime of the distributed system. Each time the weighted reputations are updated, the hierarchy may also be updated (e.g., by hierarchy organization process 506) to reflect (e.g., take into account/consider) the updated weighed reputations.

At operation 606, the hierarchy (e.g., the hierarchy generated in operation 604) may be used in the distributed system. In particular, by having data processing systems with higher weighted reputations (e.g., by prioritizing data processing systems that are less risky) located closer to a root node of the distributed system, the stability of the above-discussed authentication hierarchy (e.g., in FIGS. 3 and 4) may be improved as reliable nodes posing less risk and potential impact on a larger number of nodes signed by the reliable nodes are placed closer to the roots (e.g., directly to connected to or within a predetermined connection threshold from the root).

The method may end following operation 606.

Once obtained, the hierarchy may be used to validate authority of various entities, and received requests. The validated authority may be used to provide computer implemented services. For example, requests by entities that lack validated authority may be rejected and requests for performance of various actions from entities that have validated authority may be implemented. Consequently, the resulting computer implemented services that are provided may include performance of certain requested actions and not performed based on other requested actions.

However, over time various events may occur. The events may impact the security posture of any of the data processing systems. Consequently, any of the data processing systems may become more or less likely to be compromised depending on the impact of the events. Consequently, the hierarchy may become stale because processing systems may no longer be ordered by the hierarchy on the basis of security. Accordingly, the ordering of the hierarchy may allow less secure data processing systems to occupy more impactful locations within the hierarchy.

Turning to FIG. 7, a data flow diagram in accordance with an embodiment is shown. The data flow diagram illustrates a process of updating a hierarchy for the distributed system and security data used to validate authority within the data processing system based on the updated hierarchy. The flow in FIG. 7 may be used to adapt the operation of the distributed system as the security posture of data processing systems of the distributed system changes over time.

To identify when a hierarchy may have become outdated, the data processing systems may monitor for events that indicate a change in the security posture of any of the data processing systems have occurred. The event may be, for example, receiving a message indicating a change in security of a data processing system. The communication may be from a security organization (e.g., the national institute of standards and technology, a private organization such as a security team from an organization, etc.) that monitors various hardware and software components for vulnerabilities, compromises, etc.

When event impacting reputation 700 is identified, weighted reputation update process 702 may be performed. During weighted reputation update process 702, the change in security posture of a data processing system based on event impacting reputation 700 may be used to obtain a new weighted reputation for the data processing system. The new weighted reputation may be obtained similarly as described with respect to FIG. 5 (e.g., process 504).

Once obtained, the updated weighted reputation for the data processing system may be used in hierarchy update process 704. During hierarchy update process 704, the new weighted reputation may be used to update an existing hierarchy. For example, a new hierarchy may be obtained as described with respect to process 506 shown in FIG. 5. The new hierarchy may then be compared to the existing hierarchy to identify any changes in the positions of data processing systems. The changes may be the basis for a hierarchy update.

The hierarchy update may indicate changes to the positions of data processing systems from the existing hierarchy. The hierarchy update may be used during seamless security data update process 706 to update security data used by data processing systems of the distributed system.

During seamless security data update process 706, new certificates may be generated for data processing systems that have been repositioned in the new hierarchy. Once generated, existing certificates for the now-moved data processing systems may be invalidated.

For example, new certificates may be generated as described with respect to FIG. 2D. The existing certificates may continue to be used while the new certificates are generated.

Once the new certificates are generated, the existing certificates (that are no longer valid based on the new hierarchy) may be discarded and/or information regarding the invalidity of the existing certificates may be distributed (e.g., so that all entities know not to trust any copies of the existing certificates).

In the event that a data processing system is demoted, a data processing system higher in the hierarchy may maintain a certificate for the data processing system until the data processing system immediately above the demoted data processing system is able to establish a new certificate.

In the event that the data processing system is elevated, a data processing system higher in the hierarchy may generate a certificate for the data processing system prior to data processing system immediately above the elevated data processing prior to elevation of the elevated data processing system invalidates a certificate for the elevated data processing system.

Figure 8:
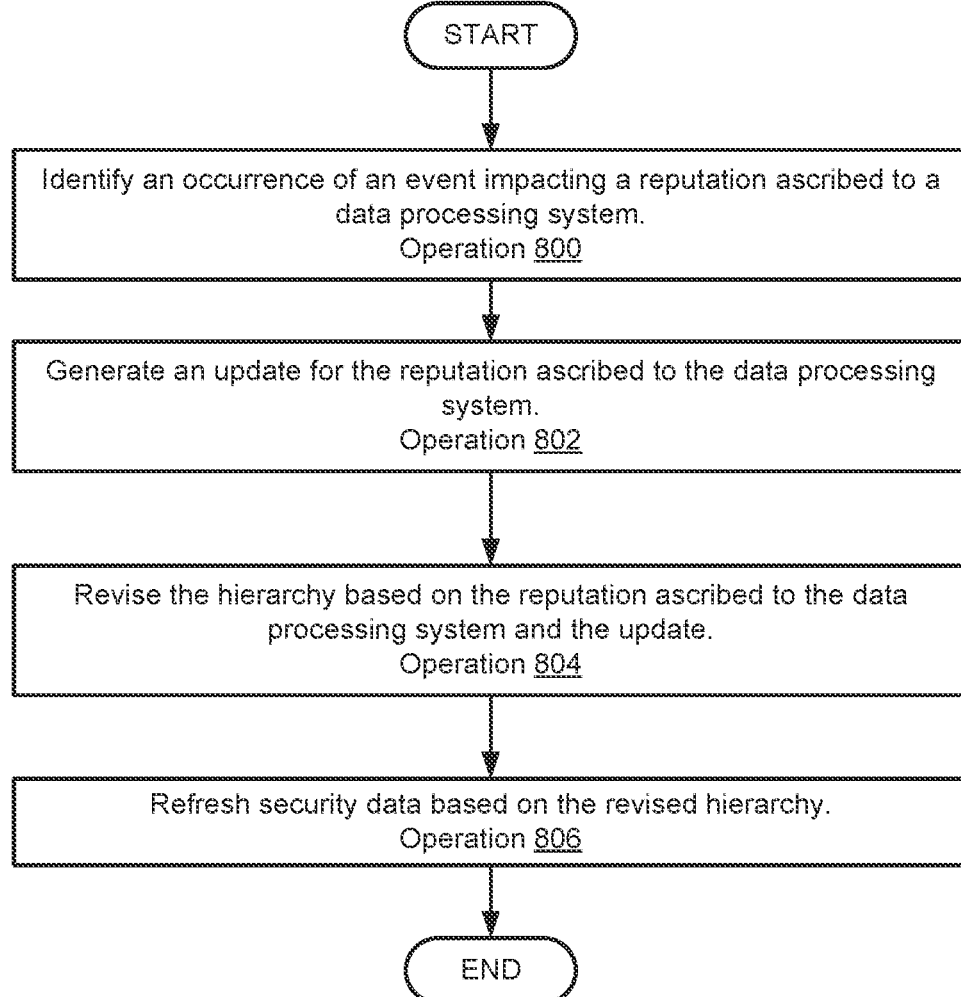
FIG. 8 shows a flow diagram illustrating a method in accordance with an embodiment.

Turning to FIG. 8, a flow diagram illustrating a method of managing responses to events impacting reputations of data processing systems in accordance with an embodiment is shown. The method may be performed by the system of FIG. 1. Any of the operations described with respect to FIG. 8 may be performed in different orders, skipped, repeated, and/or be performed in a parallel or partially overlapping in time manner.

At operation 800, an occurrence of an event impacting a reputation ascribed to a data processing system is identified. The occurrence may be identified by (i) another data processing system observing the data processing system, (ii) obtaining information regarding the occurrence, and/or other methods.

The event may indicate that the security posture of the data processing system has changed.

At operation 802, an update for the reputation ascribed to the data processing system may be updated. The updated reputation may be obtained similarly to as described with respect to process 504 of FIG. 5. For example, a function that takes into account a broad variety of information regarding the data processing may be used to obtain a quantification for the reputation of the data processing system. The function may also ingest information regarding the event.

For example, the function may use a scoring system regarding characteristics of the data processing system reflecting its security posture. The scoring system may award points based on these characteristics. The function may then normalize a score for the data processing to a predetermined range such that direct comparisons between different scores may be used to order data processing systems with respect to one another based on the normalized scores.

The scoring system may award points based on (i) a duration of time that the data processing system has been a member of the distributed system (e.g., may prefer longer or shorter duration, depending on implementation), (ii) security components hosted by the data processing system, (iii) extent of exposure of the data processing system to other entities, (iv) ratio of uptime to downtime of the data processing system, (v) time stability of network traffic to the data processing system, (vi) rate at which errors in operation of the data processing system occur (and/or other characterizations of the errors in operation of the data processing system), (vii) duration of operation of the data processing system (preference being given to longer duration of operation or shorter, depending on implementation), (viii) stability of components hosted by the data processing system (preference given to fewer changes in components), and/or (ix) other indicators of stability of the data processing system.

The update may reflect a change in the quantification and/or new quantification of the reputation for the data processing system.

At operation 804, the hierarchy may be revised based on the reputation ascribed to the data processing system and the update. The hierarchy may be revised by exchange the location of the data processing in the hierarchy with other data processing systems immediately above or below it in the hierarchy, or retaining the position of the data processing system in the hierarchy.

The determination may be made by comparing the new reputation of the data processing system to the reputations of the data processing systems immediately above and below the data processing system in the hierarchy.

If the new reputation exceeds the reputation of the data processing system above it in the hierarchy, then the position of the data processing system may be exchanged with the position of the data processing system immediately above it in the hierarchy. This process may be repeated until the new reputation is no longer higher than the reputation of data processing systems above the data processing system in the hierarchy.

A similar process may be performed for data processing systems lower in the hierarchy if the new reputation is lower than the previous reputation of the data processing system.

If the new reputation is neither higher or lower than the reputations of the data processing systems immediately above or below it in the hierarchy, then the position of the data processing system may be retained in the revised hierarchy.

At operation 806, the security data for the distributed system is revised based on the revised hierarchy. The security may be revised by refreshing the security data, as described with respect to operation 406 of FIG. 4, and with respect to FIG. 2D.

However, the security data may be refreshed in an order of operations that allow authority to continue to be checked during the refresh. New certificates may be generated prior to existing certificates that are stale being revoked (e.g., invalidated).

For example, if a data processing system is demoted in the hierarchy, a parent data processing system immediately above the data processing system in the revised hierarchy may establish a certificate for the demoted data processing system prior to the previous parent data processing system (now no longer immediately above the demoted data processing system in the hierarchy) revoking an existing certificate and/or other certificates for the demoted data processing system. Consequently, authority of the demoted data processing system may continue to be validated throughout this process.

The method may end following operation 806.

Once obtained, the refreshed security data may be used to validate authority of the data processing system thereby continuing to allow computer implemented services to be provided while maintaining security of the distributed system.

However, in some cases, a reduced reputation of a data processing system may indicate that it has been compromised rather than just being more likely to be compromised. When a data processing system is identified as having been compromised, a response may be performed to reduce an impact of the compromise on operation of a distributed system.

Turning to FIG. 9, a data flow diagram in accordance with an embodiment is shown. The data flow diagram illustrates a process of responding to a compromise event. The flow in FIG. 9 may be used to adapt the operation of the distributed system as the security posture of data processing systems of the distributed system changes over time.

As discussed above, when a reputation of a data processing system changes, it may be compared to criteria that define when a data processing system is compromised. The criteria may include, for example, a static or dynamic threshold. The reputation for a data processing system meeting the criteria may be treated as a compromise event (e.g., 900). A compromise event may be an occurrence of an event that indicates that a data processing system is compromised and attempts at remediation (e.g., described with respect to FIG. 5) may not have succeeded.

When a compromise event occurs, the distributed system of FIG. 1 may automatically respond to manage an impact of the compromised data processing system on operation of the system. To do so, response process 902 may be performed. During response process 902, a hierarchy for the distributed system may be revised by removing the node corresponding to the data processing system that is considered to be compromised from the hierarchy. Edges leading to the node may be joined to close the gap in the hierarchy.

For example, referring to FIG. 2C, if the data processing system corresponding to node 220 is considered compromised, node 220 may be removed and the edges between nodes 220, 222, 224 may be joined such that node 222 is considered to be directly connected to node 224 via an edge.

Returning to the discussion of FIG. 9, in addition to response process, impact analysis process 904 may also be performed. During impact analysis process 904, the topology of an existing hierarchy (e.g., identified by existing hierarchy 910) may be analyzed to identify a portion of data processing systems that may have been compromised due to the compromised data processing system.

For example, branches of the spanning that comprise a node corresponding to the data processing system may be identified. The node may used to identify the portion of the data processing systems. For example, the data processing systems corresponding to the nodes of the branch may be used as the suspect data processing systems, or a portion of the data processing systems may be the suspect data processing systems.

The branch may be further analyzed by identifying a location of the node within the branch. All nodes below the node in the branch, and the node immediately above the node in the branch may be identified as the suspect data processing systems. Response process 902 may be notified of the identified portion of the data processing systems.

The revised hierarchy is obtained, a selective broadcast out to the identified portion of the data processing systems of the distributed system may be made (e.g., excluding the compromised data processing system). The selective broadcast may include a request to refresh security data and the revised hierarchy (or portions thereof such that each remaining member of the distributed system may identify their place in the hierarchy).

Upon receipt, the portion of the data processing systems may initiate performance of security data update process 904. During security data update process 904, existing certificates hosted by the portion of the data processing systems may be revoked, and new certificates may be generated as described with respect to FIG. 2D. Other security data (e.g., key pairs) may also be discarded/revoked, and regenerated.

Consequently, the authority of the compromised data processing system may be globally revoked by the distributed system, and security data may be selectively reestablished.

Figure 10:
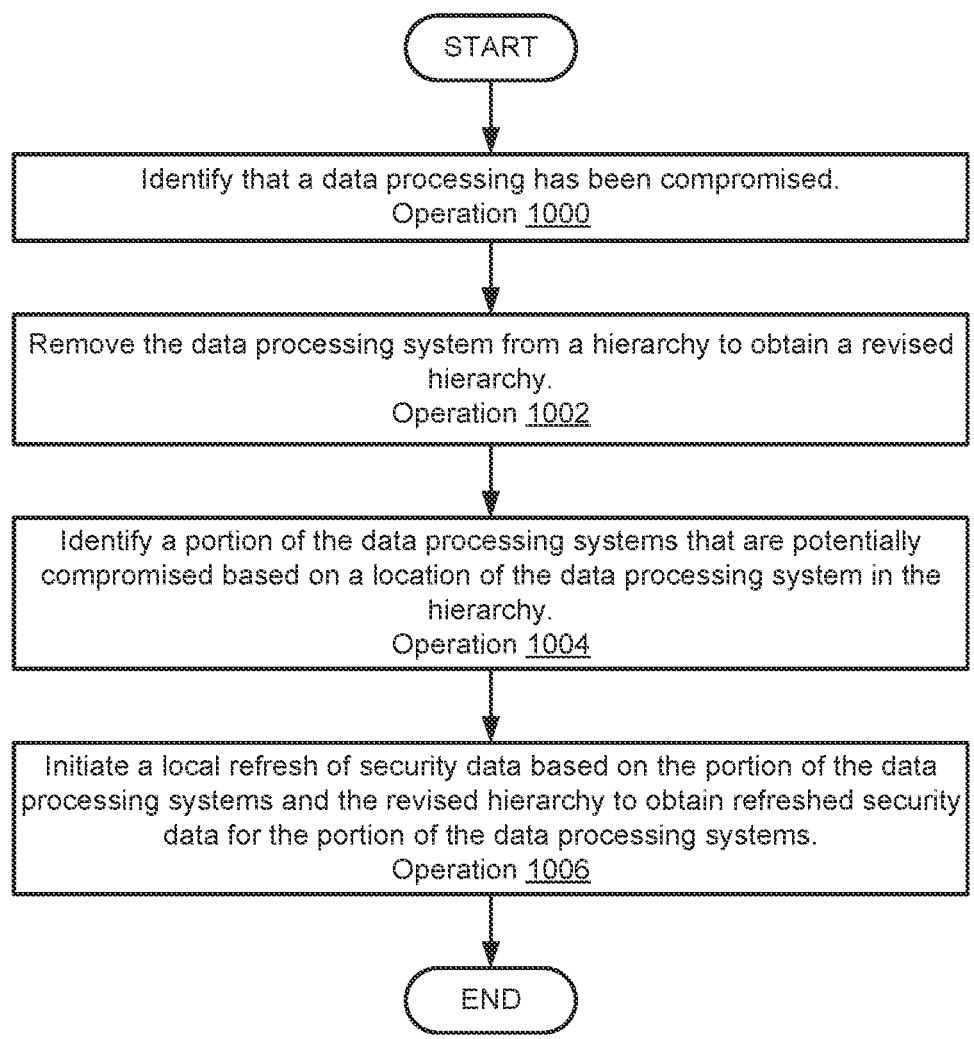
FIG. 10 shows a flow diagram illustrating a method in accordance with an embodiment.

Turning to FIG. 10, a flow diagram illustrating a method of managing the impact of compromised data processing systems in accordance with an embodiment is shown. The method may be performed by the system of FIG. 1. Any of the operations described with respect to FIG. 10 may be performed in different orders, skipped, repeated, and/or be performed in a parallel or partially overlapping in time manner.

At operation 1000, a data processing system that has been compromised may be identified. The compromised data processing system may be identified by (i) comparing the reputation of the data processing to criteria, (ii) analyzing operation of the compromised data processing system, (iii) obtaining an indication from another device that the compromised data processing system is compromised, and/or via other methods.

The criteria may include a static threshold (e.g., minimum reputation threshold) or a dynamic threshold. The dynamic threshold may be based on the average reputation of the members of the distributed system. For example, the dynamic threshold may be an acceptable level of deviation from the average reputation of the members of the distributed system. The criteria may include other metrics for identify whether a data processing system is compromised based on reputation without departing from embodiments disclosed herein.

In an embodiment, the data processing system is identified via the method illustrated in FIG. 11.

At operation 1002, the data processing system is removed from a hierarchy to obtain a revised hierarchy. The data processing system may be removed from the hierarchy by removing a node corresponding to the data processing system, and joining edges to the now-removed node.

At operation 1004, a portion of the data processing systems that are potentially compromised are identified. The portion of the data processing systems may be based on a location of the data processing system in the hierarchy. The portion of the data processing systems may be identified by (i) identifying a node of the hierarchy corresponding to the compromised data processing system, (ii) identifying a branch (e.g., nodes 220-222 shown in FIG. 2C) in which the node is positioned, (iii) identifying all a set of nodes in the branch below the node (e.g., node 222 if node 220 corresponds to the compromised data processing system) and a second node immediately above the node (e.g., node 224 if node 220 corresponds to the compromised data processing system) in the branch, and (iv) using either (a) all of the nodes in the branch, or (b) the identified set of and the second node, as the portion of the nodes. The portion of the nodes may have either been subject to requests validated by the nodes or that held cryptographic data usable to perform such validations.

At operation 1006, a local refresh of security data based on the portion of the data processing systems and the updated hierarchy is initiated to obtain refreshed security data for the portion of the data processing systems. The local refresh may be performed by broadcasting a communication to the portion of the data processing systems.

Upon receipt, each of the portion of the data processing systems may (i) revoke existing certificates, public-private key pairs, and/or other cryptographic data structures, and (ii) replace the revoked cryptographic data structures. The cryptographic data structures may be replaced similarly to as discussed with respect to FIG. 2D.

The method may end following operation 1006.

Once obtained, the refreshed security data may be used to invalidate authority of the compromised data processing system while also validating authority of other data processing systems thereby continuing to allow computer implemented services to be provided while maintaining security of the distributed system (e.g., by excluding the compromised data processing system).

However, ascertaining (i) a reputation of a data processing system, and (ii) whether a data processing system is compromised, may be challenging because other data processing systems of a distributed system may only have a partial view regarding the behavior of a distributed system. To ascertain the reputation and compromise state of a data processing system, a more comprehensive view of the behavior of the data processing system may be obtained.

To do so, information regarding the operation of the data processing system may be collected and aggregated, as shown in FIGS. 11A-11D. These figures show diagrams illustrating example processes for obtaining and using more comprehensive view of data processing systems in accordance with an embodiment.

Figure 11A:
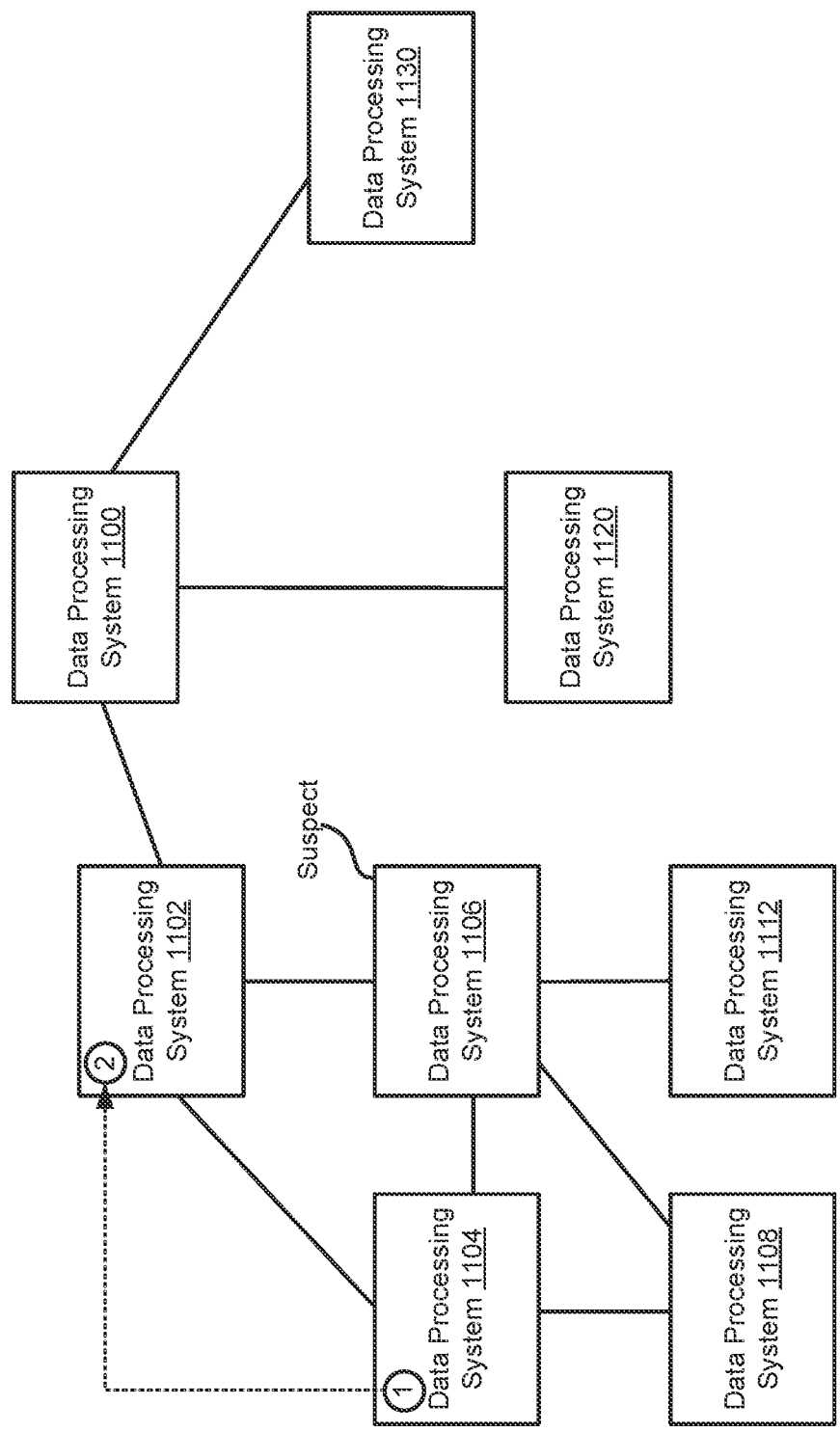
FIG. 11A-11D show data flow diagrams in accordance with an embodiment.
Figure 11B:
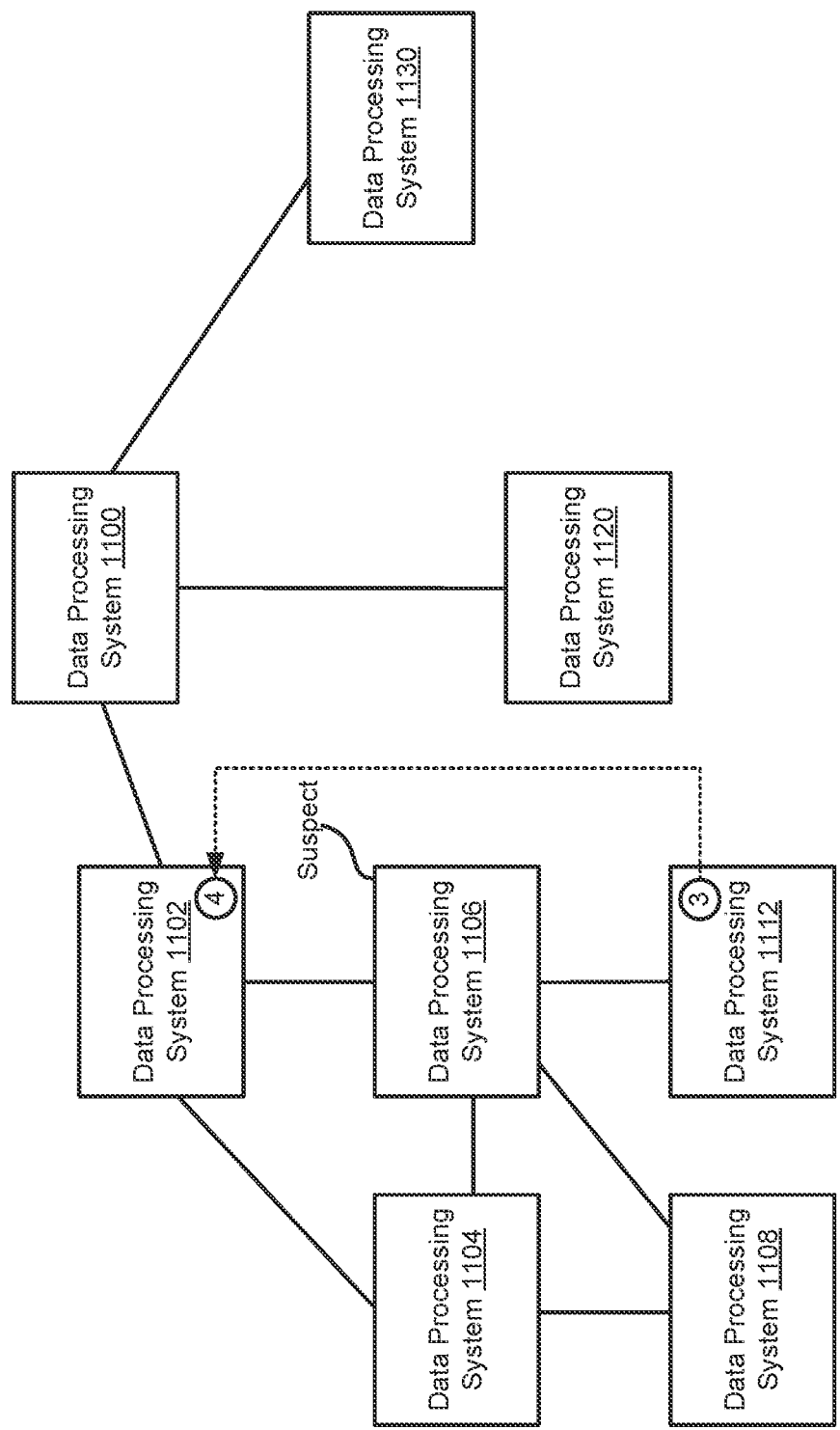
Figure 11C:
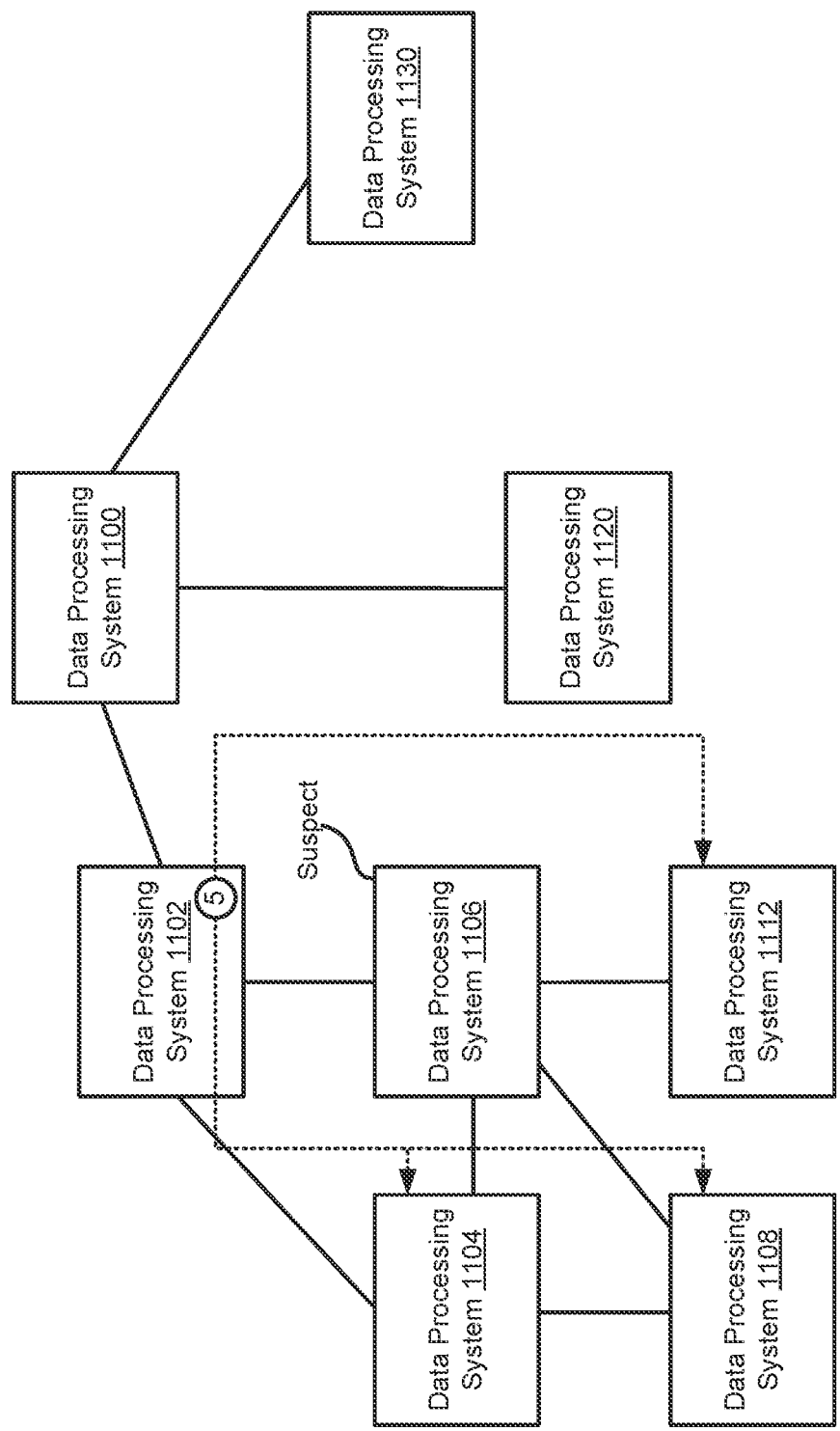
Figure 11D:
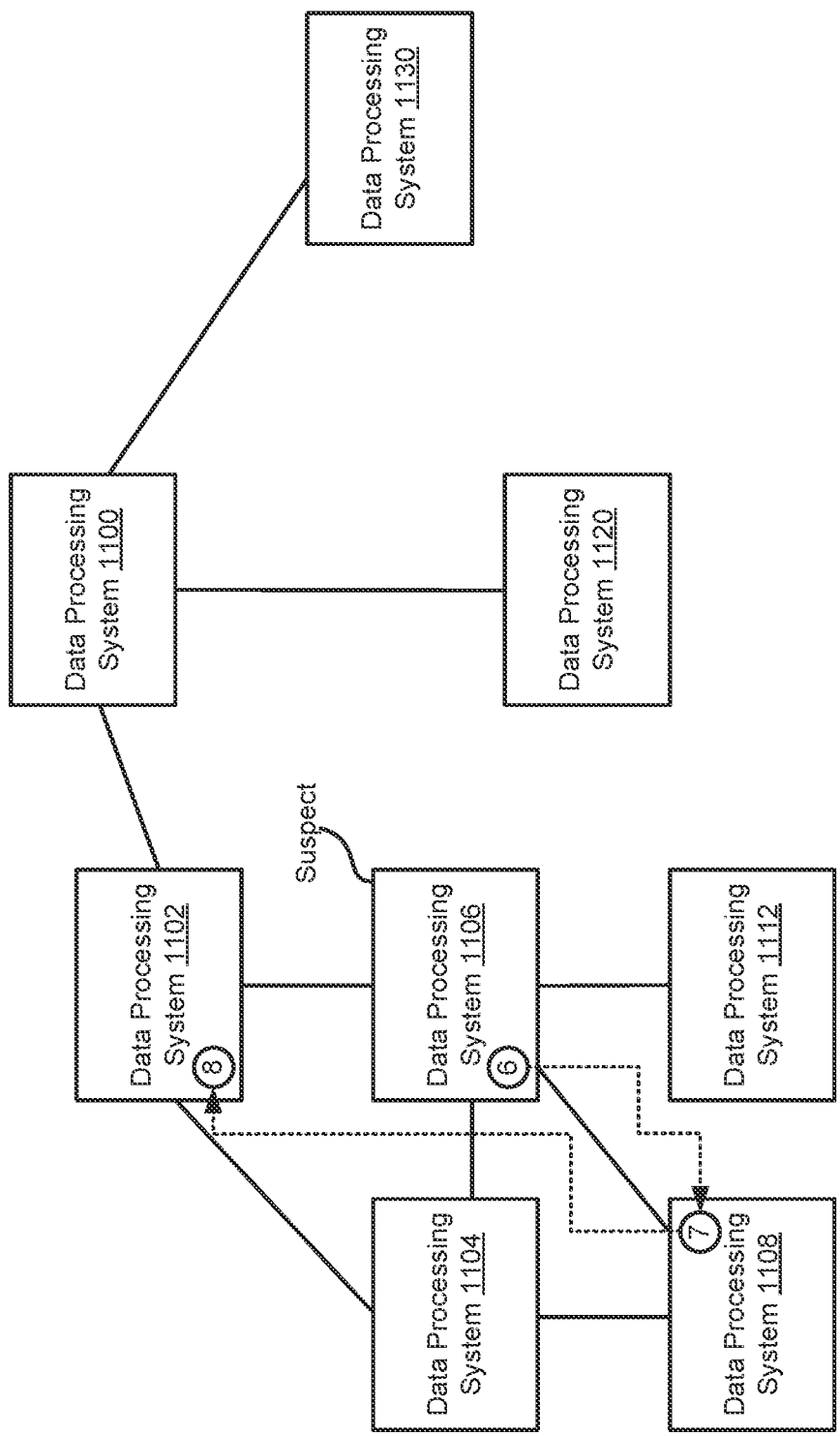

Turning to FIG. 11A, a first diagram illustrating a portion of process to construct a more comprehensive view of a data processing system in accordance with an embodiment is shown. In FIG. 11A, a portion of a distributed system include data processing systems 1100-130 is shown. The data processing systems may be similar to the data processing systems described with respect to FIG. 1. Operable connections between the data processing systems are illustrated by solid lines, activity of the data processing systems is illustrated using numbered circles, and interactions are illustrated using arrows with dashed tails. Additionally, for simplicity, the data processing systems are organized in accordance with a predefined hierarchy (not illustrated) with data processing systems positioned higher in the hierarchy being located higher on the page. Thus, data processing system 1102 may be higher than data processing systems 1104-1106, which may be higher than data processing systems 1108-1112. Data processing system 1102 may be authoritative for data processing system 1106. In other words, data processing system 1102 may maintain a certificate to validate authority of data processing system 1106. FIGS. 11B-11D show similar diagrams, but for different periods of time.

Consider an example scenario in which data processing system 1106 begins to send an unusual quantity of traffic to data processing system 1104. Data processing system 1104 may identify this activity as being a potential indication of data processing system 1106 being compromised. For example, data processing systems 1100-1130 may perform passive monitoring of other data processing systems to identify position suspect activity.

Based on this activity, at operation 1, data processing system may generate and send a report to data processing system 1102. The report may indicate that this suspect activity is occurring.

Data processing system 1102 may, at operation 2, receive and process the report by revising a reputation ascribed to data processing system 1106. In this example, the revised reputation may still not meet criteria related to a compromised data processing system, but may meet criteria indicating that additional action should be taken to identify whether data processing system 1106 is compromised. Consequently, data processing system 1102 may not take any action with respect to data processing system 1106.

However, data processing system 1102 may instruct data processing systems 1104, 1108, 1112 to perform activity monitoring for data processing system 1106.

Turning to FIG. 11B, based on the instructions, at operation 3, data processing system 1112 may actively investigate the manner in which data processing system 1106 is shaping traffic that it receives. Data processing system 1112 may do so by sending test network data units (e.g., packets) to data processing system 1106, and observe the response. In this example, data processing system 1106 may shape the traffic in an unexpected manner (e.g., deprioritize it). Consequently, data processing system 1112 may send a report to data processing system 1102 which indicates that data processing system 1106 may be compromised.

When received, at operation 4, data processing system 1104 may update the reputation ascribed to data processing system 1106. In this example, the ascribed reputation may be reduced sufficiently to meet the criteria indicating that data processing system 1106 is compromised.

Turning to FIG. 11C, based on the determination, at operation 5, data processing system 1102 may revoke certificates for data processing system 1106, and initiate refresh of security data of the data processing system 1104, 1108, 1112 that may have been compromised by data processing system 1106.

Turning to FIG. 11D, once the refresh is complete, data processing system 1106 may continue to attempt to use its authority. For example, at operation 6, data processing system 1106 may instruct data processing system 1108 to perform an action. However, when data processing system 1108 attempts to validate the authority of data processing system 1106 at operation 7, the authority may not be validated. For example, when a check of the authority is performed at operation 8, no certificate usable to validate authority of data processing system 1106 may be available. Consequently, data processing system 1106 may be treated as lacking authority to initiate performance of the action.

Figure 12:
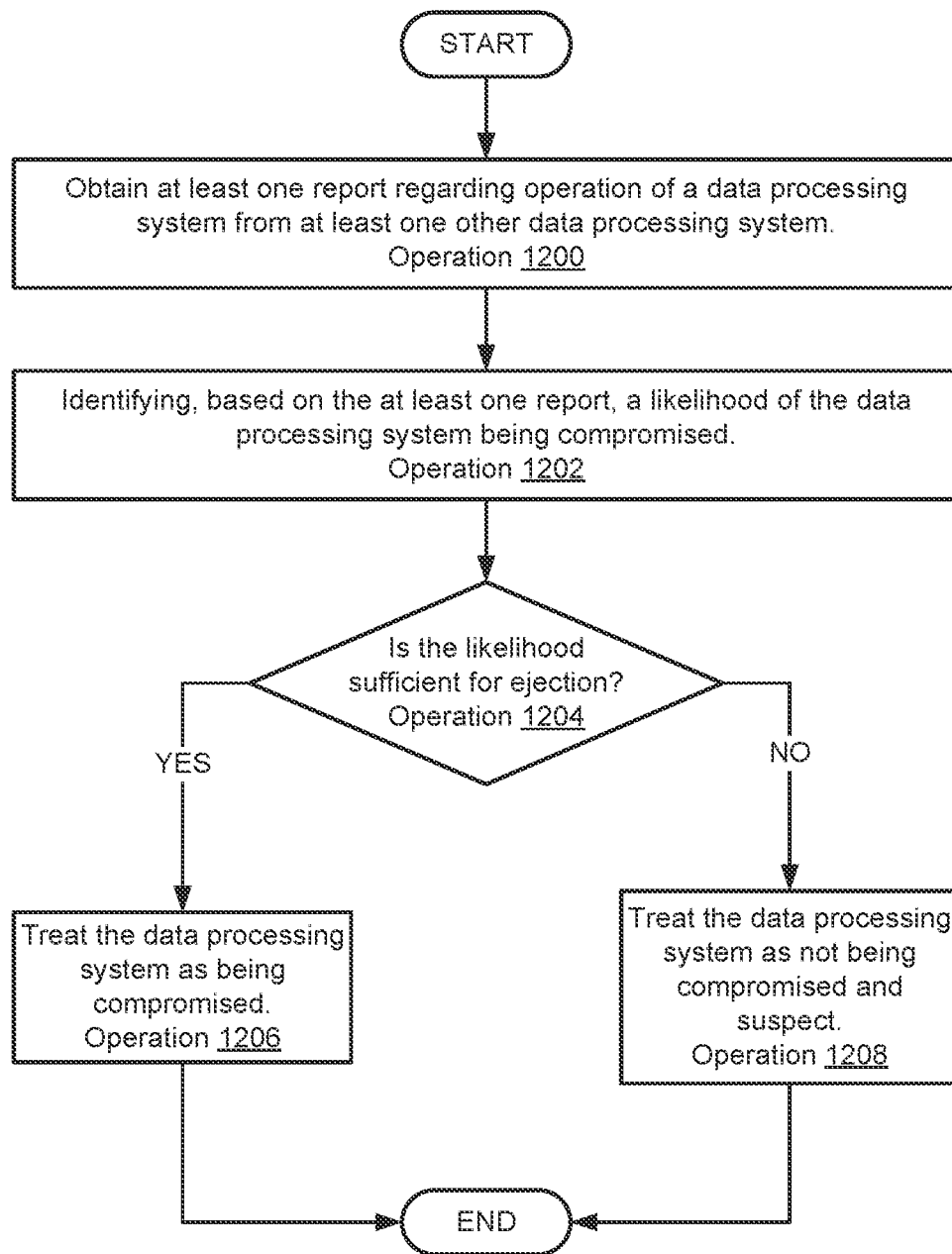
FIG. 12 shows a flow diagram illustrating a method in accordance with an embodiment.

Turning to FIG. 12, a flow diagram illustrating a method of determining whether a data processing system is compromised in accordance with an embodiment is shown. The method may be performed by the system of FIG. 1. Any of the operations described with respect to FIG. 10 may be performed in different orders, skipped, repeated, and/or be performed in a parallel or partially overlapping in time manner.

The method of FIG. 12 may be performed, for example, to identify the data processing system as discussed with respect to operation 1000 of FIG. 10.

At operation 1200, at least one report regarding operation of a data processing system from at least one other data processing system is obtained. The at least one report may be obtained by receiving the report from the at least one other data processing system.

For example, any number of data processing systems may automatically passively monitor other data processing systems for signs of compromise. The signs of compromise may be identified through interactions which the data processing systems have with the data processing system. The data processing systems may passively monitor the behavior of the data processing system, and compare the monitored behavior to any number of known behaviors that indicate potential compromise of the data processing system. When the monitored behavior matches any of the known behaviors, the data processing systems may automatically generate and send a report of the behavior to an authoritative data processing system for the suspect data processing system. The authoritative data processing system may be directly above the suspect data processing system in the hierarchy.

Any number of such reports may be received from any number of data processing systems. The reports may be stored for future use.

At operation 1202, a likelihood of the data processing being compromised may be identified based on the at least one report. The likelihood may be identified by (i) obtaining a revised reputation for the data processing system, (ii) comparing the revised reputation to criteria which indicate that the data processing system is compromised if the criteria is met, and (iii) comparing the revised reputation to another criteria which indicates that the data processing system is suspected of compromised.

If the other criteria is met but the criteria is not met (e.g., a low reputation but not sufficiently low to indicate compromise), the data processing systems that may observe activity of the suspect data processing system may be instructed to actively monitor the suspect data processing system for signs of compromise. To do so, the data processing systems may (i) gather supplemental reports (e.g., through additional monitoring), (ii) engage with the suspect data processing system (e.g., by sending communication designed to elicit certain responses) to gather directed supplemental reports, and/or perform other actions to gather information to determine whether the data processing system is compromised.

At operation 1204, a determination is made regarding whether the likelihood is sufficient to conclude that the data processing system is compromised and, therefore, should be ejected from a distributed system. The determination may be made by comparing the revised reputation to the criteria. The criteria may be, for example, a threshold. If the revised reputation meets the threshold (e.g., falls below a minimum reputation threshold), then it may be determined that the likelihood is sufficient for ejection.

If the likelihood is sufficient for ejection, then the method may proceed to operation 1206. Otherwise, the method may proceed to operation 1208.

At operation 1206, the data processing system is treated as being compromised. The data processing system may be treated as being compromised by (i) removing the data processing system from the hierarchy, and (ii) performing a local refresh of security data, as discussed with respect to operation 1002-1006.

The method may end following operation 1206.

Returning to operation 1204, the method may proceed to operation 1208 when the likelihood is insufficient for ejection.

At operation 1208, the data processing system is not treated as being compromised, and may be treated as being suspect. The data processing system may not be treated as being compromised by retaining certificates usable to validate authority of the data processing system. The data processing system may be treated as being suspect by initiating performance of active monitoring.

The active monitoring may be initiated by sending instructions to data processing systems in communication with the data processing system to perform actions to illicit responses that may indicate (or be probative of) whether the data processing system is compromised. Upon receipt, the data processing systems may begin to actively monitor the data processing system, in addition to continuing to perform passive monitoring.

In an embodiment, at least a portion of the active monitoring is cooperative. For example, a portion of the data processing systems may cooperatively send traffic to the data processing system to identify traffic shaping policies of the data processing system, may perform other cooperative actions, and/or may otherwise cooperate to obtain information probative of whether the data processing system is compromised.

The active monitoring may be established based on monitoring plans, which may be generated by the authoritative data processing system. The monitoring plan may specify acts to be perform, metrics to be computed, and/or criteria for making decision. The instructions sent to the data processing systems may include or be based on the monitoring plans.

The method may end following operation 1208.

While removing authority of compromised data processing systems from a distributed system may address control issues, the compromised data processing systems may still be used to support communications between the remaining members of a distributed system.

To facilitate communications after ejection of a data processing system, the distributed system may be remodeled, similarly to as shown in FIGS. 13A-13B. These figures show diagrams illustrating example processes for updating the operation of a distributed system after ejection of a compromised member in accordance with an embodiment.

Turning to FIG. 13A, a first diagram illustrating a portion of a process to remodel a distributed system in accordance with an embodiment is shown. In FIG. 13A, a portion of a distributed system include data processing systems 1100-130 is shown. The data processing systems may be similar to the data processing systems described with respect to FIGS. 11A-11D. Operable connections between the data processing systems are illustrated by solid lines, activity of the data processing systems is illustrated using numbered circles, and interactions are illustrated using arrows with dashed tails. Additionally, for simplicity, the data processing systems are organized in accordance with a predefined hierarchy (not illustrated) with data processing systems positioned higher in the hierarchy being located higher on the page. Thus, data processing system 1102 may be higher than data processing systems 1104-1106, which may be higher than data processing systems 1108-1112. Data processing system 1102 may be authoritative for data processing system 1106. In other words, data processing system 1102 may maintain a certificate to validate authority of data processing system 1106. FIGS. 11B-11D show similar diagrams, but for different periods of time.

Consider an example scenario, following on the example scenario described with respect to FIGS. 11A-11D, in which data processing system 1106 is identified as being compromised and is ejected from the distributed system. While data processing system 1106 may be prevented from asserting authority, it still may be relied upon to relay communications.

For example, data processing system 1112 may be operably connected to the other data processing systems by critical link 1300 served by data processing system 1106. Critical link 1300 may be a sole link between one or more data processing systems and other data processing systems of a distributed system. In contrast, redundant links 1302, 1304, 1306, 1308 may be one of multiple links connecting data processing systems to other data processing systems.

For example, redundant links 1302, 1304 may operably connect data processing system 1108 to multiple other data processing systems. Redundant links 1306, 1308 may be similar for data processing system 1104.

In contrast, critical link 1300 may be the only link through which data processing system 1112 may communicate with other data processing systems. Consequently, data processing system 1112 may only be able to communicate with other data processing systems via data processing system 1106, which is compromised in this example.

To address such challenges, each of data processing systems 1100-1130 may automatically analyze the communication topology and nearest neighboring data processing systems following an ejection of any of the data processing systems. For example, at operation 9, data processing system 1112 may identify that it is connected via critical link 1300 to a compromised data processing system.

In contrast, data processing system 1108 may identify that it is not connected to a critical link served by a compromised data processing system because it is connected via redundant links served by at least one data processing system that is not compromised. However, if data processing system 1104 was also compromised, data processing system 1108 would identify both links as critical links served by compromised data processing systems.

Based on this identification, data processing system 1112 may automatically initiate a remodel of its connectivity. To do so, data processing system 1112 may establish operable connections to other data processing systems. Data processing system 1112 may establish the operable connections by (i) moving its location (e.g., to be closer to data processing systems 1108, 1120 which are not compromised), (ii) boosting its signal to enhance range, and/or performing other operations to facilitate communication with other data processing systems that are members of the distributed system (e.g., as defined by a revised hierarchy).

Turning to FIG. 13B, in this example, data processing system 1112 may include some mobility features and may move as indicated by the oversized arrow. The instance of data processing system 1112 drawn in dashing to the left is included to indicate that data processing system 1112 has moved from this location, and that the critical link has been disabled based on the move.

If the critical link had not been disabled, traffic shaping policies of data processing system 1112 may be updated to discourage flow of traffic via the critical ink and to data processing system 1106. For example, the quality of service for the critical link, equal cost multipath settings, and/or other traffic shaping policies may be modified to reduce and/or prevent traffic from flowing via the critical link.

Once moved, data processing system 112 may establish new critical link 1320. New critical link 1320, while a critical link, is not served by a compromised data processing system (e.g., in this example data processing system 1120 is not compromised). Consequently, data processing system 1112 may communicate with other data processing systems of the distributed system without risk of the communications between seen by or manipulated by data processing system 1106.

Figure 14:
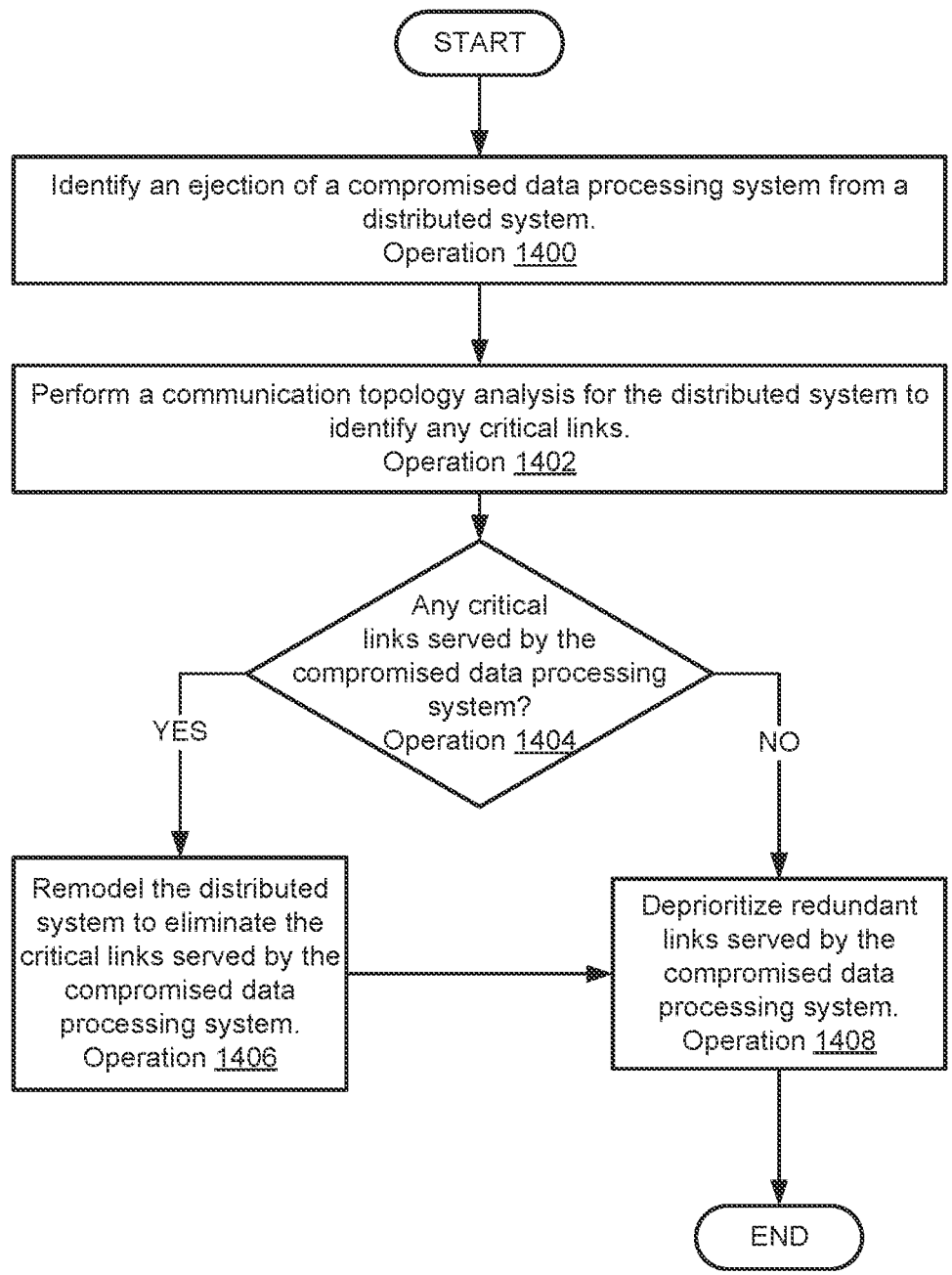
FIG. 14 shows a flow diagram illustrating a method in accordance with an embodiment.

Turning to FIG. 14, a flow diagram illustrating a method of managing a distributed system after ejection of a member in accordance with an embodiment is shown. The method may be performed by the system of FIG. 1. Any of the operations described with respect to FIG. 14 may be performed in different orders, skipped, repeated, and/or be performed in a parallel or partially overlapping in time manner.

The method of FIG. 14 may be performed, for example, as part of a response to a data processing system being treated as being compromised as discussed with respect to operation 1206 of FIG. 12.

At operation 1400, an ejection of a data processing system from a distributed system is identified. The ejection may be identified based on a communication received from an authoritative data processing system that ejected the data processing system. For example, when the authoritative data processing system determined that the data processing system is compromised, the authoritative data processing system may send the communication. The communication may indicate that the data processing system is compromised.

The ejection may be partial or complete. If the ejection is complete, then, as will be discussed in greater detail below, transmission of data via the ejected data processing system may be entirely prevented. However, if the ejection is partial, then data originated by the ejected data processing system may be allowed but transmission of data to the ejected data processing system may be entirely prevented.

At operation 1402, a communication topology analysis for the distributed system is performed to identify whether any critical links are present. A critical link may be one or more links that exclusively connect any data processing system to compromised data processing systems (or are logically exclusive due to limits on the carrying capacity of data via other links). In other words, a link may be considered critical if a data processing system is unable to communicate with other data processing systems except via compromised data processing systems that serve the critical link (e.g., are on one end of the link).

In contrast, links that are considered redundant may allow a data processing system to communicate with a set of other data processing systems where at least one is not compromised. Thus, for redundant links, traffic shaping to preferentially direct traffic along the redundant link to the non-compromised data processing system may be employed to reduce exposure of traffic to compromised data processing systems.

The communication topology analysis may be performed by each data processing system of the data processing systems. Each data processing systems may match the data processing systems reachable via communications via their ports. If a data processing system is required to route network data units via compromised data processing systems, then the link served by the compromised data processing systems may be critical links.

At operation 1404, a determination is made regarding whether any critical links are served by the compromised data processing system. The determination may be made based on the communication topology analysis. In other words, if a data processing system is not connected by redundant links, then it may be determined that the compromised data processing system serves a critical link to the data processing system.

If any critical links are served by the data processing system, then the method may proceed to operation 1406. Otherwise, the method may proceed to operation 1408.

At operation 1406, the distributed system is remodeled to eliminate critical links served by the data processing system. The distributed system may be remodeled by (i) establishing new links, and/or (ii) disabling critical links. The new links may ensure that data processing systems are not cut off from communicating with other data processing systems due to the disabling of the critical links.

The new links may be established by (i) modifying the location of data processing systems that use the critical links served by the data processing system to new locations that facilitate connection formation (e.g., closer to other data processing systems), (ii) boosting power to wireless communications to enhance communication range to facilitate connection formation, etc. Any of the data processing systems may be mobile (e.g., may have wheels and drive chains, may be airborne, etc.), thereby allowing the data processing systems to reposition themselves to establish new operable connections.

By establishing new links, the critical links may be rendered to be merely redundant links. Consequently, once established, traffic shaping may be used to direct traffic away from the compromised data processing system while still allowing for communication between data processing systems.

At operation 1408, redundant links served by compromised data processing system are deprioritized (e.g., for communication purposes). The redundant links served by compromised data processing systems may be deprioritized by modifying traffic shaping policies implemented by the data processing systems that use the redundant links served by the compromised data processing systems. To perform traffic shaping, the network data unit forwarding behavior of the data processing systems may be modified.

The forwarding behavior may be modified by adjusting equal cost multipath settings such that traffic is unlikely to traverse the redundant link serviced by the compromised data processing system (may be more likely to traverse other redundant links), by adjusting quality of service goals for the redundant link serviced by the compromised data processing system, by shutting off a port of a data processing system connected to the redundant link serviced by the compromised data processing system, etc.

For example, returning to the discussion of FIG. 13B, traffic shaping may be used to ensure that traffic from data processing system 1108 is unlikely to traverse redundant link 1304 thereby exposing the traffic to data processing system 1106, which is compromised in this example. Similarly, traffic shaping may be used to ensure that traffic from data processing system 1104 is unlikely to traverse redundant link 1306 thereby also exposing the traffic to data processing system 1106.

The type and extent of traffic shaping applied may be based on whether the data processing system is partially or completely ejected (e.g., which may depend on the reputation of the data processing system, different criteria may be used to identify whether to entirely or partially eject a data processing system). If only partially ejected, then the traffic shaping applied by other data processing systems may still allow for data originated by the partially ejected data processing system to be transmitted (e.g., receiving ports may not be turned off) but may prevent transmission of other data to the partially ejected data processing system (e.g., sending ports to the partially ejected data processing system may be throttled). However, if entirely ejected, then both sending and receiving ports for the completely ejected data processing system may be throttled thereby prevent both originated and forward data from flowing to and from the completely ejected data processing system.

The method may end following operation 1408.

Thus, using the method illustrated in FIG. 14, a system in accordance with embodiments disclosed herein may automatically remodel the manner in which communications are made after authority of a compromised data processing system is revoked.

Figure 15:
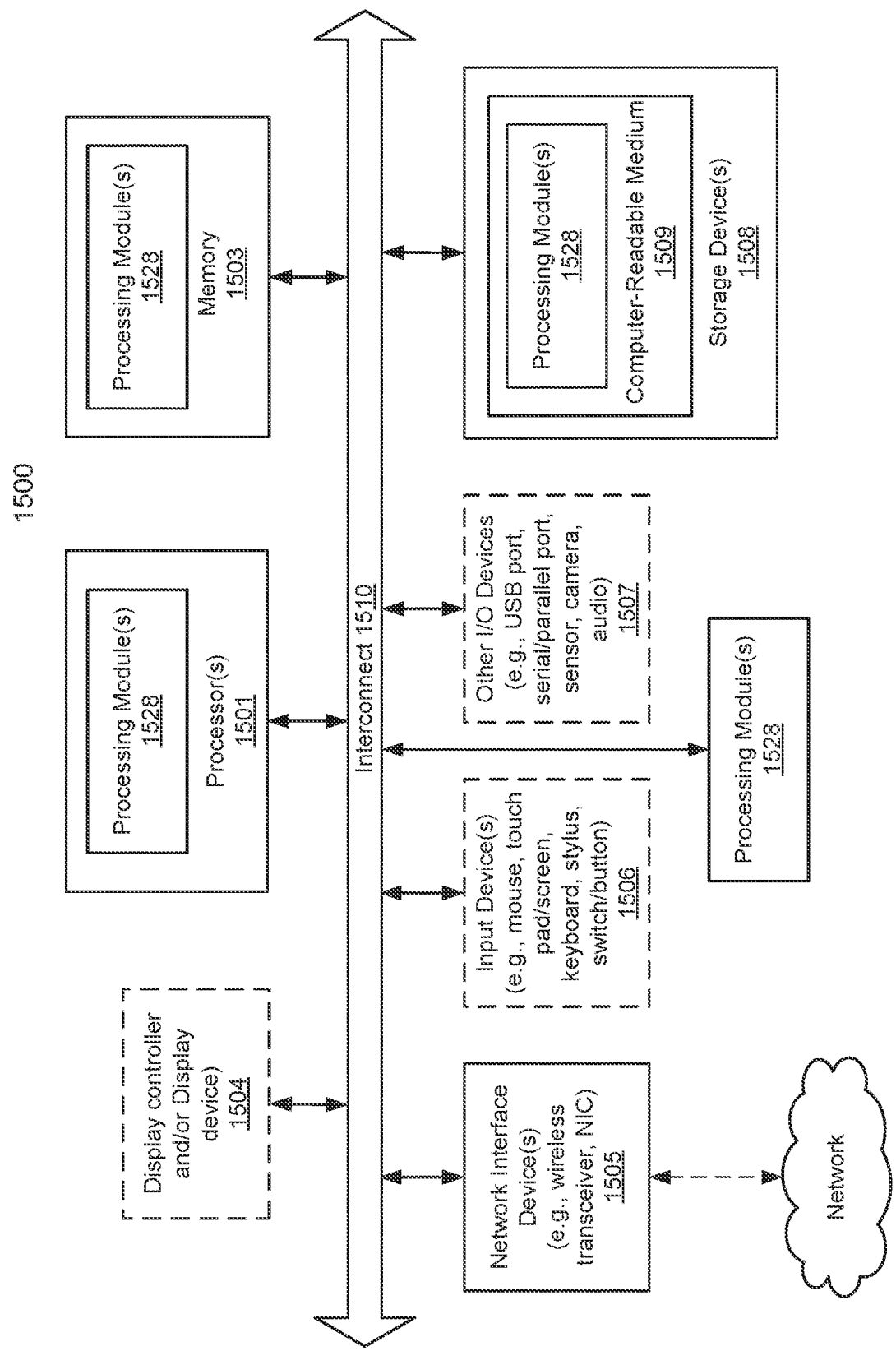
FIG. 15 shows a block diagram illustrating a data processing system in accordance with an embodiment.

Any of the components illustrated in FIGS. 1-2F, 5, 7, 9, 11A-11D, and 13A-13B may be implemented with one or more computing devices. Turning to FIG. 15, a block diagram illustrating an example of a data processing system (e.g., a computing device) in accordance with an embodiment is shown. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1507 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices (e.g., 1505, 1506, 1507, 1508) including network interface device(s) 1505, optional input device(s) 1506, and other optional IO device(s) 1507. Network interface device(s) 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with a display device of optional graphics subsystem 1504), a pointer device such as a stylus, and/or a keyboard (e.g., physical keyboard or a virtual keyboard displayed as part of a touch sensitive screen). For example, input device(s) 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-readable storage medium 1509 (also known as a machine-readable storage medium or a computer-readable medium) on which is stored one or more sets of instructions or software (e.g., processing module, unit, and/or processing module/unit/logic 1528) embodying any one or more of the methodologies or functions described herein. Processing module/unit/logic 1528 may represent any of the components described above. Processing module/unit/logic 1528 may also reside, completely or at least partially, within memory 1503 and/or within processor 1501 during execution thereof by system 1500, memory 1503 and processor 1501 also constituting machine-accessible storage media. Processing module/unit/logic 1528 may further be transmitted or received over a network via network interface device(s) 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing security of a distributed system comprising data processing systems, the method comprising:

identifying an ejection of a data processing system of the data processing systems from the distributed system, the data processing system being ejected due to a likelihood of the data processing system being compromised;

based on the ejection, performing a communication topology analysis of the distributed system to identify any critical links of the distributed system;

making a determination regarding whether any of the critical links are served by the data processing system;

in a first instance of the determination where at least one of the critical link is served by the data processing system:

remodeling the distributed system to eliminate the at least one of the critical links served by the data processing system; and deprioritizing redundant links of the distributed system served by the data processing system.

2. The method of claim 1, wherein remodeling the distributed system comprises:

establishing a new link that renders the critical link to be a redundant link.

3. The method of claim 2, wherein establishing the new link comprises:

moving a second data processing system that uses the critical link to a new location where the second data processing system can communicate with a third data processing system; and using communication between the second data processing system and the third data processing system to setup the new link.

4. The method of claim 2, wherein the critical links are links for which no redundant links are available, and the new link being a redundant link for the critical link.

5. The method of claim 4, wherein deprioritizing the redundant links of the distributed system served by the data processing system comprises:

updating traffic shaping policies of a portion of data processing systems that use the critical links to preferentially direct traffic over the redundant link rather than the critical link.

6. The method of claim 4, wherein deprioritizing the redundant links of the distributed system served by the data processing system comprises:

disabling ports of the data processing system associated with the critical link.

7. The method of claim 1, wherein the likelihood of the data processing system being compromised is based on reports regarding activity of the data processing system from at least two of the data processing systems.

8. The method of claim 7, wherein the reports are used to revise a reputation of the data processing system, and the data processing system likely to be compromised when the reputation falls below a threshold.

9. A non-transitory machine-readable medium having instructions stored therein, which when executed by a processor, cause the processor to perform operations for managing security of a distributed system comprising data processing systems, the operations comprising:

identifying an ejection of a data processing system of the data processing systems from the distributed system, the data processing system being ejected due to a likelihood of the data processing system being compromised;

based on the ejection, performing a communication topology analysis of the distributed system to identify any critical links of the distributed system;

making a determination regarding whether any of the critical links are served by the data processing system;

in a first instance of the determination where at least one of the critical link is served by the data processing system:
- remodeling the distributed system to eliminate the at least one of the critical links served by the data processing system; and
- deprioritizing redundant links of the distributed system served by the data processing system.

10. The non-transitory machine-readable medium of claim 9, wherein remodeling the distributed system comprises:
establishing a new link that renders the critical link to be a redundant link.

11. The non-transitory machine-readable medium of claim 10, wherein establishing the new link comprises:
moving a second data processing system that uses the critical link to a new location where the second data processing system can communicate with a third data processing system; and
using communication between the second data processing system and the third data processing system to setup the new link.

12. The non-transitory machine-readable medium of claim 10, wherein the critical links are links for which no redundant links are available, and the new link being a redundant link for the critical link.

13. The non-transitory machine-readable medium of claim 12, wherein deprioritizing the redundant links of the distributed system served by the data processing system comprises:
updating traffic shaping policies of a portion of data processing systems that use the critical links to preferentially direct traffic over the redundant link rather than the critical link.

14. The non-transitory machine-readable medium of claim 12, wherein deprioritizing the redundant links of the distributed system served by the data processing system comprises:
disabling ports of the data processing system associated with the critical link.

15. The non-transitory machine-readable medium of claim 9, wherein the likelihood of the data processing system being compromised is based on reports regarding activity of the data processing system from at least two of the data processing systems.

16. The non-transitory machine-readable medium of claim 15, wherein the reports are used to revise a reputation of the data processing system, and the data processing system likely to be compromised when the reputation falls below a threshold.

17. A member data processing system, comprising:
a processor; and
a memory coupled to the processor to store instructions, which when executed by the processor, cause the processor to perform operations for managing security of a distributed system comprising data processing systems, the operations comprising:
- identifying an ejection of a data processing system of the data processing systems from the distributed system, the data processing system being ejected due to a likelihood of the data processing system being compromised;
- based on the ejection, performing a communication topology analysis of the distributed system to identify any critical links of the distributed system;
- making a determination regarding whether any of the critical links are served by the data processing system;
- in a first instance of the determination where at least one of the critical link is served by the data processing system:
  - remodeling the distributed system to eliminate the at least one of the critical links served by the data processing system; and
  - deprioritizing redundant links of the distributed system served by the data processing system.

18. The member data processing system of claim 17, wherein remodeling the distributed system comprises:
establishing a new link that renders the critical link to be a redundant link.

19. The member data processing system of claim 18, wherein establishing the new link comprises:
moving a second data processing system that uses the critical link to a new location where the second data processing system can communicate with a third data processing system; and
using communication between the second data processing system and the third data processing system to setup the new link.

20. The member data processing system of claim 18, wherein the critical links are links for which no redundant links are available, and the new link being a redundant link for the critical link.

* * * * *